US008817959B1

(12) United States Patent
O'Hanlon

(10) Patent No.: US 8,817,959 B1
(45) Date of Patent: Aug. 26, 2014

(54) SYSTEM FOR HANDLING MESSAGES AND DISTRIBUTING INFORMATION

(71) Applicant: Kenneth P. O'Hanlon, Abingdon (GB)

(72) Inventor: Kenneth P. O'Hanlon, Abingdon (GB)

(73) Assignee: O'Harlan Ltd, Abingdon, Oxford (GB)

( * ) Notice: Subject to any disclaimer, the term of this patent is extended or adjusted under 35 U.S.C. 154(b) by 0 days.

(21) Appl. No.: 13/887,761

(22) Filed: May 6, 2013

(51) Int. Cl.
*H04M 11/00* (2006.01)
*H04M 11/06* (2006.01)

(52) U.S. Cl.
CPC .................................. *H04M 11/066* (2013.01)
USPC ..................................... 379/93.24; 379/88.13

(58) Field of Classification Search
None
See application file for complete search history.

(56) References Cited

U.S. PATENT DOCUMENTS

| | | | |
|---|---|---|---|
| 5,103,449 A | 4/1992 | Jolissaint | |
| 5,729,600 A | 3/1998 | Blaha et al. | |
| 5,737,393 A | 4/1998 | Wolf | |
| 5,867,780 A | 2/1999 | Malackowski et al. | |
| 5,915,001 A | 6/1999 | Uppaluru | |
| 7,062,020 B1 | 6/2006 | Pirasteh et al. | |
| 7,881,285 B1 | 2/2011 | Hammond | |
| 8,027,998 B2 * | 9/2011 | Uehori et al. ................. | 707/796 |
| 8,599,836 B2 | 12/2013 | Van Buren et al. | |
| 2004/0125939 A1 | 7/2004 | Drobek | |
| 2004/0240642 A1 * | 12/2004 | Crandell et al. ........... | 379/88.22 |
| 2006/0047568 A1 | 3/2006 | Eisenberg et al. | |
| 2006/0104425 A1 | 5/2006 | Peters | |
| 2006/0149644 A1 | 7/2006 | Sulmar et al. | |
| 2006/0217135 A1 | 9/2006 | Moore et al. | |
| 2007/0041527 A1 | 2/2007 | Tuchman et al. | |
| 2008/0008309 A1 | 1/2008 | Dezonno et al. | |
| 2008/0267374 A1 | 10/2008 | Colson et al. | |
| 2009/0254633 A1 * | 10/2009 | Olive .......................... | 709/218 |
| 2009/0285384 A1 | 11/2009 | Pollock et al. | |
| 2010/0239075 A1 | 9/2010 | Kobylevsky et al. | |
| 2011/0182283 A1 | 7/2011 | Van Buren et al. | |

\* cited by examiner

*Primary Examiner* — Duc Nguyen
*Assistant Examiner* — Assad Mohammed
(74) *Attorney, Agent, or Firm* — Marian J. Furst

(57) ABSTRACT

System for handling messages and distributing information between subscribers and their customers and contact. Each system subscriber can generate customized landing and flyer web pages called flyer pages for each of the subscriber's products, services, and/or listings. Landing and flyer pages can contain multiple links to other flyer pages. When a subscriber's customer or contact views a landing or flyer page and clicks on a link presented on that page, the system provides subscriber's information to a customer or contact immediately after the information is requested. The system can also make a lead, including a record of that event, and present the record to the subscriber who owns the landing or flyer page, allowing a subscriber to view a report with a history of who has viewed which page for all leads generated for their pages. Leads are tracked through a process that includes steps of lead generation and lead propagation. Embodiments of the system include a system for tracking sales leads, an internet-based wagering system, and an emergency response system.

24 Claims, 18 Drawing Sheets

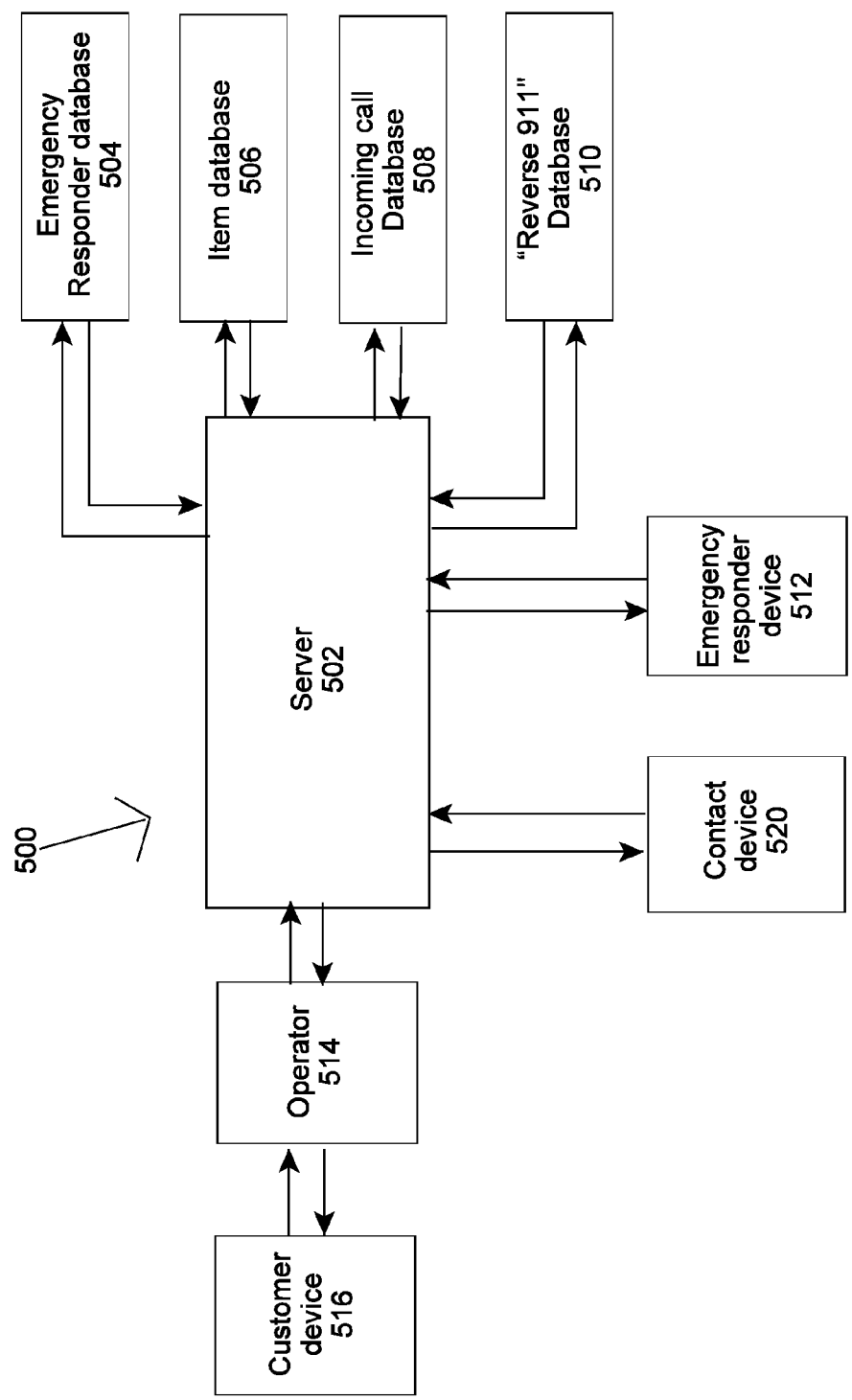
Fig. 16 Emergency response SYSTEM OVERVIEW

SYSTEM FOR HANDLING MESSAGES AND DISTRIBUTING INFORMATION

CROSS REFERENCE TO RELATED APPLICATIONS

This application is a continuation-in-part of copending U.S. application Ser. No. 13/536,847, filed on Jun. 28, 2012, in the name of the same inventor and having the title, "System for Responding to QR Codes, ShotCodes, MobiTags, 2-Dimensional Bar Codes, 3-Dimensional Bar Codes, and Images," which is a continuation-in-part of U.S. provisional application No. 61/501,920, filed on Jun. 28, 2011, in the name of the same inventor and having the title, "QR Code Response System," the entire disclosures of which are incorporated herein in their entirety by this reference. This application is also a continuation-in-part of copending U.S. application Ser. No. 12/378,922, filed on Feb. 21, 2009, in the name of the same inventor and having the title, "Dynamic Multiple Server IVR Strings," which claims the benefit of U.S. application Ser. No. 11/303,499, filed on Dec. 17, 2005, in the name of the same inventor and having the title, "Text Brochure and Media System and Method," now issued as U.S. Pat. No. 7,643,821 B2, both of which are incorporated herein by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

FIELD OF THE INVENTION

The present invention relates generally to system for handling messages and distributing information that interacts with a digital telephonic device, and more particularly to a system for providing leads based on requests for information.

BACKGROUND OF THE INVENTION

Sellers, buyers, and lessors of property are familiar with the difficulty of getting text brochures describing an item for sale or rent into the hands of the interested potential buyer. One common solution, used in real estate and some retail settings, is the box having a number of brochures or flyers within it. In the case of real estate, a home for sale may have a "FOR SALE" yard sign, with or without a rider (a smaller sign attached to the main sign), and a box or tube which is supposed to contain flyers for interested parties to take when they notice the house. The problems with this system are numerous, the single most important problem being that the box is empty more often than it contains flyers. Replenishing the boxes of flyers is a hit or miss business at best and is time intensive, even if passers by and potential buyers take only one flyer each.

Various solutions have been considered for providing a system by which a potential buyer may see a text brochure describing an item for sale without these disadvantages. One solution has been the replacement of the original flyer box with a recorded audio message, which may be broadcast by low power radio or made available to those calling a certain number. With such a system there is no possibility of putting the facts actually in the hands of the potential buyer. This is a large disadvantage in terms of sales psychology, because people like to see photographs of the item they are interested in buying. A different solution has been the "fax back," in which an interested party places a call and an automatic system sends a fax in response. The disadvantage of this system is that the interested party is most interested at the moment they actually are at the home, vehicle, etc, or the moment when they see the advertisement of that item, and there is little chance that the typical individual will be able to receive a fax immediately.

Another solution has been to distribute text and images of an item for sale or lease (such as a home) immediately to interested parties, without the requirement of a fax machine or the like. For example, one system, found at www.house4cell.com, uses an SMS text message access number on a real estate "rider" type sign (a small sign placed on top of a yard sign) to make potential buyers aware that they may send a text message and receive in reply another text message Most SMS text message systems still have certain difficulties, however. First and foremost, numerous potential buyers will not voluntarily send or do not know how to send an SMS text message, for reasons such as the irritation of pushing telephone buttons multiple times in order to get the desired letter of the alphabet of a single word of a message. In addition, while these systems claim that a reply may be received in "seconds," this is not the nature of SMS text messaging. Normally, telecommunication service providers assign a lower priority to SMS messages than to voice communications, so SMS messages may enter a queue rather than being sent directly to the intended recipient. When this delay is multiplied by a factor of two, once for the SMS message requesting information and once for the return message, the interested party may have to wait for hours prior to receiving a response message.

U.S. Pat. No. 7,643,821 describes a system and method for providing SMS-formatted text brochures with information about an item. These text brochures can include a variety of types of media, such as links, text about the item, images of the item, and video clips of the item. Further, both the original message and the response message are handled with the same priority as voice communications.

Interactive voice response systems allow customers to access by telephone a computer-controlled menu system and interact with that system either by pushing DTMF codes on their telephone or by speaking simple voice commands to the system.

While the use of IVR systems has become extremely common, a quick review of IVR systems is in order. A caller may desire to obtain information (such as closing time) from a retail establishment (such as a department store). The customer dials the store number and receives a greeting, and the following dialog might ensue.

"Hello, welcome to the XYZ Department Store. For English, Press 1. Por Espanol, o prima el numero dos." If the customer prefers English, they might press the "1" key on their telephone keypad. If they prefer Spanish, they might press "2". Either key will send a DTMF code, which is a pair of tones at standardized frequencies. For example, "1" may send two tones, one at a frequency of 697 KHz and the other at a frequency of 1209 KHz, while "2" may send tones, at 697 KHz and 1336 KHz.

The IVR system of the department store will then decode the pair of tones sent. If the tones match the number 1, the IVR will proceed to play a next set of audible options (a verbal menu) in English, while if the tones decode as 2, the IVR will play the menu in Spanish. If the caller entered some other number or key such as 0, the IVR system will play an error message such as "That tone was not understood."

An example of a menu in English might be as follows. "For hours and locations, press 1. For payments, press 2. For a list of our departments, press 3. To hear about exciting new specials at the XYZ Department Store, press 4. To leave a message, press 5. To return to the previous menu, press 0."

Such dialogs can be quite lengthy and may involve numerous levels and options for large organizations.

Up to the present time, it had been necessary to individually program IVR systems, that is each individual IVR system up until now has been unique. This individual programming requirement increases the cost of IVR systems dramatically due to the necessity to have teams of programmers work on each new IVR system.

Quick Response codes or "QR codes" are used increasingly for conveying information, particularly in advertising. QR codes are 2-dimensional matrices of black and white squares that function as a two-dimensional bar code, developed to allow high-speed decoding. They can be read by a variety of decoding devices, including dedicated QR code readers and many smart phones provided with QR code reader applications. Originally developed for tracking parts during vehicle manufacturing, QR codes may be used for other purposes, including conveying information to the reading device user. QR code generators are readily available to those who want to generate and print their own codes, and there is a published ISO standard for QR codes.

Other types of codes perform similar functions. MobiTags were developed by Microsoft and do essentially the same thing as QR Codes but use color. ShotCodes were developed in England by the University of Cambridge and can be scanned by a camera phone without requiring a downloaded app for decoding the image and viewing an encoded mobile web page. A ShotCode consists of data circles surrounding a center point. ShotCodes store a look up number consisting of 49 bits of data. A central server decodes the look up number, which is linked to a URL, and sends the URL back to the scanner. (http://www.shotcodes.com/) 2-dimensional and 3-dimensional bar codes may be used in a similar manner.

Increasingly, QR codes, MobiTags, and ShotCodes are being used as a means of communicating with mobile phone users, with links to internet addresses and/or Uniform Resource Locators (URLs) provided in the codes. Code displays are presented in magazines, or on signs, buses, business cards, or almost any object about which a code publisher believes users might need or want information. Users with a camera phone in the case of a ShotCode, or a smart phone in all other cases, equipped with the correct reader application can scan the image of the bar code or QR code to receive a URL that will open a mobile web page that displays the content that has been uploaded to the mobile web page, including a link to a text display, an email message, Vcard contact information, or a link to connect to a wireless network or to open a web page in the telephone or digital mobile device's browser.

QR codes, MobiTags, and 2D bar codes are becoming a popular means of advertising, allowing the advertiser to disseminate a code that provides information to anyone who uses their mobile phone or other reading device to read the code. The advertiser's outgoing message associated with the code can be changed easily, without having to change the code, making the use of the code inexpensive and efficient for the advertiser.

To date, tracking and usage analytics of QR codes have been limited to providing information on the identification and the IP address of the device that reads the code. This information is used to geo-locate the device, letting the tracker know where the reader device is located, but not specifically who the user is. For user identification, the user must complete a form that appears as part of the mobile web page returned to the reader or respond to questions provided in an email or text message. Such user responses can be used in numerous ways, including:

re-using user data, so that the user only has to complete the form once;

limiting the number of times a user can enter a contest or respond to an offer provided via the QR code; or providing an offer for products or services.

While these uses may include incentives for the user to respond, they cannot generate leads for subsequent contacts if the user doesn't complete the form. The large majority of users does not respond to the forms.

At present, only "smart phones" with QR code reader apps or other QR code reading devices can be used to scan a QR code and access the provider's URL. Such smart phones with the capability of using downloaded apps, such as a QR code reading app, currently account for close to one half of the mobile telephone devices in use. Many more camera phones are in use, able to record images and ShotCodes but unable to receive and use downloadable apps.

Thus, there is a need for a message handling and information distribution system that can respond to incoming messages received in a variety of formats, including voice communications; SMS text communications; codes received from an IVR; QR codes; ShotCodes; bar codes; and images of QR codes, ShotCodes, and bar codes. Further the system should be able to collect automatically user-specific contact information from devices that send incoming messages and then use that information for identifying and users and, optionally, subsequently contacting the users.

There is an additional need for a system that can provide access to an advertiser's URLs using an incoming voice communication, an SMS text message, an IVR code, an image of a code, an image of an item associated with the code, or a video of the item. There is a further need for a system that can facilitate prompt responses to users who access the system by sending a voice communication, an SMS text message, or a communication sent via an IVR code, or by reading a QR code, ShotCode, and/or bar code. In addition, there is a need for a system that can automatically recognize images and collect user-specific contact information from devices that provide the images and, optionally, subsequently contact the users. There is an additional need for a system that can provide access to URLs using an image of an object, which may be a photographic image, QR code, ShotCode, or bar code. There is a further need for a system that can facilitate prompt responses to users who access the system by sending a voice communication, an SMS text message, a message via an IVR, or by reading a QR code, ShotCodes, read QR codes and/or bar codes.

It would be advantageous to provide a message handling and information distribution system that combines the capabilities of receiving incoming messages in a variety of formats from a telecommunications device; simultaneously opening multiple ports on the device from the telecommunications device; and providing responses to the incoming message in a manner that includes prioritized SMS messaging and other communications with multiple ports of the telecommunications device, with the responses formatted for the telecommunications device; tracking identifying information about the telecommunications device; and providing lead routing to at least one party interested in knowing the identifying information.

It would also be advantageous to provide a message handling and information distribution system that can provide one or more links to one or more URLs in a communication back to the telecommunications device, with identifying information about the telecommunications device included in the links to allow tracking of identifying information about the telecommunications device through one or more of the URLs when a subsequent link accessed by one of the URLs is opened.

It would further be advantageous to provide a system by which a database of potential buyer information or a "prospect database" may be created and accessed, including prospects identified when they access links provided on URLs.

It would further be advantageous to provide a system by which a user can opt into and/or opt out of receiving additional information relating to similar items for sale or lease at a later time.

It would be advantageous to provide a message handling and information distribution system that includes an IVR system which allows advertisers to set-up, customize and change their own IVR responses with minimal technical assistance.

It would be further preferable to provide a message handling and information distribution system that can geo-locate the device of a caller.

SUMMARY

To achieve the foregoing and other objects and in accordance with the purpose of the present invention broadly described herein, embodiments of this invention comprise a system for handling messages and distributing information. The system comprises:

means for processing information;

means for receiving incoming messages from customer telecommunication devices, said incoming messages selected from telephone calls, text messages, email messages, code messages, images, video, and combinations thereof, and for sending outgoing messages selected from text messages and email messages, said means for receiving incoming and sending outgoing messages in communication with said means for processing information;

means for transmitting incoming subscriber information from a subscriber communication device to said means for processing and for sending lead reports from said means for processing to said subscriber device;

a subscriber database with information relating to at least one subscriber, said subscriber database accessible by said means for processing information;

an item database with web page URLs provided by the at least one subscriber containing information about at least one item offered by the at least one subscriber to the customers, said item database accessible by said means for processing information; and a customer database containing identifying information about the customers, said customer database accessible by said means for processing information.

The system is capable of performing, during an interaction with a customer, operations selected from:

receiving a request from a customer telecommunication device for additional information;

sending messages to the customer telecommunications device to provide links to URLs containing information from said item database combined with identifying information about the particular customer device to the customer devices, said identifying information selected from the telecommunications device model, the telecommunications device telephone number, the telecommunications device network address, and combinations thereof;

responding to a request from a customer for information by combining at least one URL from said item database with identifying information about the customer to form a new URL and sending an outgoing message with a link to the new URL to the customer, said outgoing message formatted for the telecommunication device model;

tracking said identifying information about the customer device for each request for information received from the customer, said identifying information selected from the telecommunications device model, the telecommunications device telephone number, the telecommunications device network address, and combinations thereof; and sending reports to the subscriber whose information was requested, said reports including the date and time said subscriber information was requested, identifying information about the contact, and identifying information about the items associated with the URLs the customer requested and for which the links were opened on the customer telecommunications device.

The means for processing information may comprise a server. The system may further comprise a message handler for receiving incoming messages from customers and transmitting outgoing messages to customers, and it may additionally comprise a subscriber-programmable IVR in communication with said message handler. The content of said item database may subscriber-controlled. The messages sent to the customer telecommunications device may be selected from text messages and email messages. The system may be operative to allow each subscriber to change subscriber landing and flyer page URLs and key words and tags for search engine optimization previously provided and stored in said item database. The customer device contact information incorporated into said new URL may be encrypted as a hash digest.

The system may comprise an internet wagering system or an emergency response system in which each subscriber is an emergency responder.

The system may further comprise a contact database containing identifying information about contact telecommunication devices to which information may be sent independently of communications with customer devices. The contact database may be accessible by said means for processing information. In this case, the system may be capable of performing, during an interaction with a contact, operations selected from:

initiating a contact with a contact telecommunications device using contact identifying information retrieved from said contact database;

receiving a request from the contact telecommunications device for additional information;

sending messages including links to URLs containing information from said item database combined with identifying information about the particular contact device to the contact devices, said identifying information selected from the telecommunications device model, the telecommunications device telephone number, the telecommunications device network address, and combinations thereof;

responding to a request from a contact telecommunications device for information by combining at least one URL from said item database with identifying information about the contact to form a new URL and sending an outgoing message with a link to the new URL to the contact, said outgoing message formatted for the telecommunications device model;

tracking the identifying information about the contact device for each request for information received from the contact, said identifying information selected from the telecommunications device model, the telecommunications device telephone number, the telecommunications device network address, and combinations thereof;

sending reports to the subscriber whose information was requested, said reports including the date and time said subscriber information was requested, identifying information about the contact, and said items associated with the URLs the contact requested and for which the links were opened on the contact telecommunications device; and combinations thereof.

The messages sent to the customer telecommunications device may be selected from text messages and email messages. The system may be an emergency response system wherein:

each said at least one subscriber is an emergency responder;

each customer is a person who initiates an interaction with said system via a text or email message;

said system is operative to initiate an interaction with at least one contact telecommunications device with a message selected from text messages, email messages, and combinations thereof; and said system is operative to receive notifications from each contact telecommunications device, said notification indicating the date and time the outgoing message was viewed and identifying information about the contact telecommunications device.

The system may be further operative to perform functions selected from:

receiving, from a customer, contact identifying information about a plurality of contacts from a customer, said contact identifying information selected from contact names, contact email addresses, and contact telephone numbers; storing said contact identifying information in said contact database;

retrieving said contact identifying information from said contact database, said contact information selected by a subscriber; and combinations thereof.

The system may handle incoming and outgoing text messages with the same priority as telephone calls. There may be no length limit for incoming and outgoing text messages, and incoming and outgoing text messages may include SMS formatted information selected from text, links to URLs, images, video, and combinations thereof.

The system may further comprise at least one feature selected from:

customer opt-in features for receiving additional information;

customer opt-out features for receiving additional information;

customer opt-in features for opting into geolocation by said system;

customer opt/out features for opting out of geolocation by said system;

contact opt-in features for receiving additional information;

contact opt-out features for receiving additional information;

contact opt-in features for opting into geolocation by said system; and contact opt/out features for opting out of geolocation by said system;

Other embodiments of the system comprise a method for handling messages and distributing information. The method comprises the steps of:

a. receiving subscriber information including identifying information about each subscriber, and a plurality of URLs including at least one flyer page URL and at least one landing page URL with a link to at least one of said flyer page URLs, for which URLs the customer wants links disseminated; storing said subscriber identifying information in a subscriber database and storing said landing and flyer page URLs in an item database;

b. receiving an initial request from a customer telecommunications device for a subscriber landing page URL in said item database, said request being in response to an advertisement and having a format selected from telephone calls, text messages, email messages, codes, images, and video;

c. collecting identifying information about said customer telecommunications device, said information selected from email addresses, telephone numbers, and combinations thereof and retrieved from a location selected from said customer device, a customer database, and combinations thereof;

d. retrieving said landing page URL, combining said landing page URL with said customer device identifying information to form a new landing page URL with said customer device identifying information included in each flyer page link on said landing page;

e. sending an outgoing message to the customer device, said message including a link to said new landing page URL;

f. receiving a request from said customer device to display a flyer page URL corresponding to a link on said landing page;

g. retrieving said customer-requested flyer page URL from said item database, combining said customer-requested URL with said customer device identifying information to form a new flyer page URL, said new flyer page URL including at least one link to an additional flyer page URL;

h. sending an outgoing message to the customer device, said message including said new URL;

i. reporting the date and time when said incoming request was received to a subscriber device; and j. storing said reported information in said customer database.

Steps f through j may be repeated.

The method may further comprise the steps of:

forming a session containing information about said customer device;

recording in said session the date and time of each customer request for a subscriber landing page and each customer request for a subscriber flyer page, said identifying information about the customer device; and which subscriber landing and flyer pages were requested;

saving said session in said customer database; and retrieving said session from said customer database.

The customer device identifying information may be encrypted in each message sent to said customer device.

Yet other embodiments of the present invention comprise a method for handling messages and distributing information. The method comprises the steps of:

a. receiving subscriber information including identifying information about each subscriber, and a plurality of URLs including at least one flyer page URL and at least one landing page URL with a link to at least one of said flyer page URLs, for which URLs the subscriber wants links disseminated; storing said subscriber identifying information in a subscriber database and storing said landing and flyer page URLs in an item database;

b. receiving identifying information about at least one contact telecommunications device, said contact identifying information including data selected from the contact's name, the device telephone number, the telephone network address, and combinations thereof, and storing said contact information in a contact database;

c. receiving subscriber information including a selection of at least one of said landing page URLs in said item database, at least one of said flyer page URLs in said item database, and at least one contact selected from said contact database;

d. sending an outgoing message to each of said selected contacts, each of said outgoing messages including a link to at least one of said landing page URLs, with each outgoing message having a format selected from text messages and email messages;

e. receiving a response from a contact device requesting one of said landing page URLs;

f. retrieving said landing page URL, combining said landing page URL with said contact device identifying information to form a new landing page URL with said contact device identifying information included in each flyer page link on said landing page;

g. sending an outgoing message to the contact device, said message including a link to said new landing page URL;

h. receiving a request from said contact device to display a flyer page URL;

i. retrieving said contact-requested flyer page URL from said item database, combining said contact-requested URL with said contact device identifying information to form a new flyer page URL, said new flyer page URL including at least one link to an additional flyer page URL;

j. sending an outgoing message to the contact device, said message including said new URL;

k. reporting the date and time when said incoming request was received to a subscriber device; and l. storing said reported information in said contact database.

Steps h through l may be repeated.

The method may further comprise the steps of:

forming a session containing information about the contact device;

recording in said session the date and time of each contact request for a subscriber landing page and each contact request for a subscriber flyer page, said identifying information about the contact device, and which subscriber landing and flyer pages were requested;

saving said session in said contact database; and retrieving said session from said contact database.

The contact device identifying information may be encrypted in each message sent to said contact device.

BRIEF DESCRIPTION OF THE DRAWINGS

These and other features, aspects, and advantages of the present invention will become better understood with reference to the following description, appended claims, and accompanying drawings, where:

FIG. 16 is a block diagram of an emergency response system in accordance with the present invention.

DESCRIPTION OF THE PREFERRED EMBODIMENTS

Figure 1:
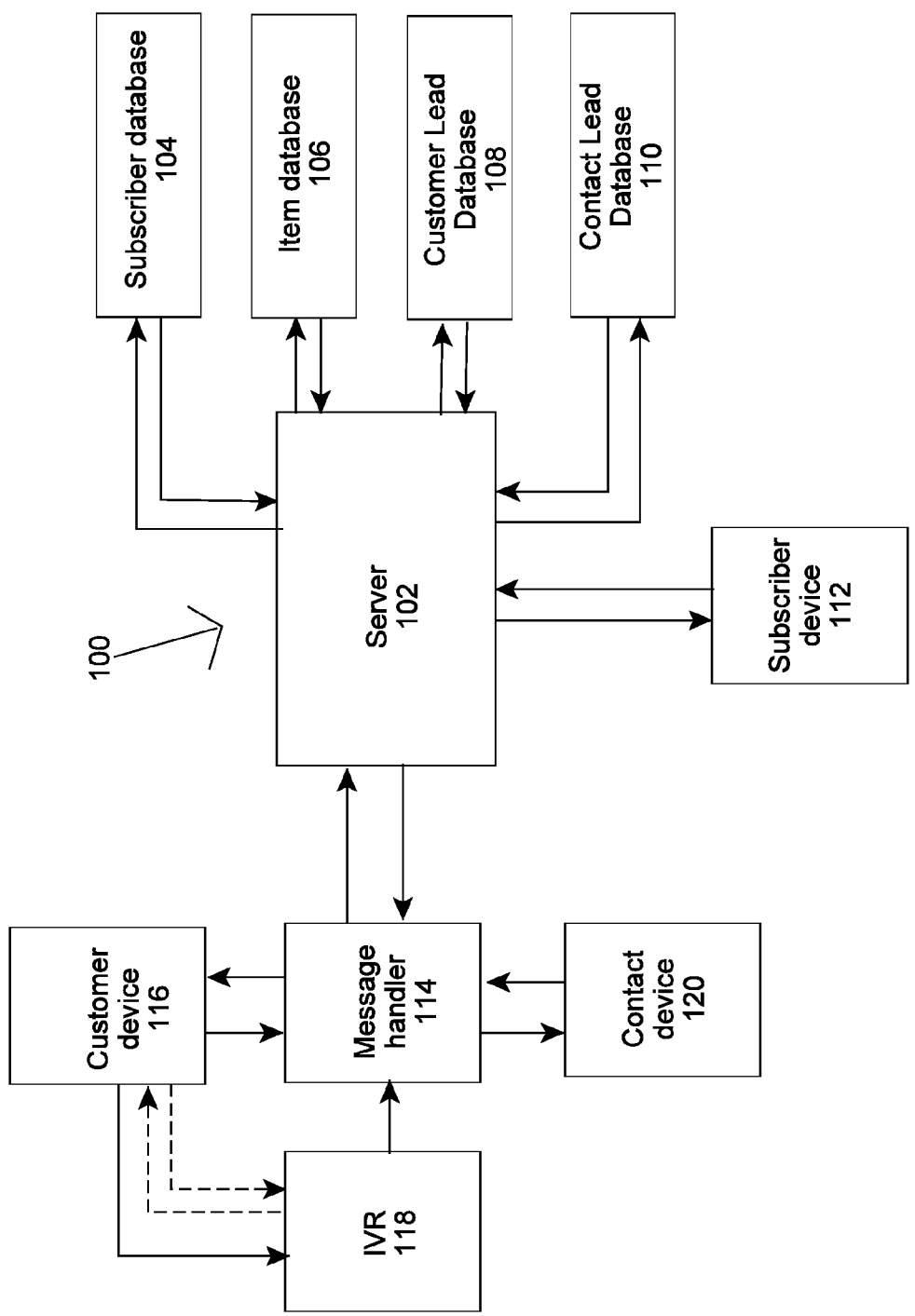
FIG. 1 is a block diagram of one embodiment of a system in accordance with the present invention.

The present invention comprises a system for handling messages and distributing information between subscribers and their customers and contact. The system gives each subscriber the ability to generate his/her/its own customized landing web page and separate web pages called flyer pages for each of the subscriber's products, services, and/or listings. Landing and flyer pages can and often do contain many links to other flyer pages. When a subscriber's customer or contact views a landing or flyer page and clicks on a link presented on that page, the system provides subscriber's information to a customer or contact immediately after the information is requested. The system can make a record, called a "lead", of that event and present the record to the subscriber who owns the landing or flyer page; this is called lead tracking. Lead tracking allows the system to present to a subscriber a history of who has viewed which page for all leads generated for their pages. Lead tracking can be accomplished through a process that includes steps of lead generation and lead propagation.

As used herein, the term "subscriber" refers to a party that arranges for distribution of information placed in the subscriber information database and receipt of reports from the system. A subscriber may be an individual or an organization, and a subscriber may have multiple offices and/or multiple agents. The term "agent" means a person acting on behalf of a subscriber, such as a salesperson. The subscriber's information may be for advertising or other purposes. "Customer" refers to an actual or prospective customer of the subscriber, and "contact" refers to a party designated by a customer for receiving information. The contact may be the same person or a different person from the designating customer. Customers and contacts interact with the system through internet-enabled telecommunications devices, and a contact's device may be the same or a different device from the device of the referring customer. The term "device" refers to an electronic communication device, such as a telephone, tablet, laptop computer, or desktop computer, that is capable of sending and receiving messages in a variety of formats selected from formats for voice telephone calls, text messages, email messages, codes, images, and video. Text messages may include SMS-formatted information selected from text, links, images, video, and combinations thereof.

The term "code" means a QR codes or other type code, including ShotCodes, Mobi Tags, 2-dimensional bar codes, 3-dimensional bar codes, images, video, or DTMF codes from an IVR, as described in application Ser. Nos. 12/378,922 and 13/536,847.

The term "landing page" refers to a web page that is intended to be the first page of a subscriber that a customer or contact views, also generally known as a "home page." A "flyer page" is a web page with additional information offered by a subscriber. Both landing pages and flyer pages may contain one or more links to additional flyer pages. Also, the flyer pages may be home pages of other subscribers who have engaged in a comarketing arrangement with the initial subscriber whose landing page is accessed. The term "item" refers to an URL that includes information about an object and may be presented by a subscriber to a customer or contact, such as a real estate property or a product for sale. The term "WAP" refers to wireless application protocol.

The system of the present invention is capable of operating with multiple subscribers, multiple types of items, and multiple customers, with numerous simultaneous interactions between customers, contacts, and the system. Process steps surrounded by dashed lines in the drawings may be repeated any number of times, and optional steps are shown with dashed arrows.

An overview of one embodiment of the system 100 is provided in FIG. 1. Server 102 is in contact with a subscriber information database 104, an item database 106, and a customer database 108, and a contact database 110. Databases 104, 106, 108, and 110 may be stored on one or more additional servers or physical storage devices, or they may be placed in the internet cloud. A subscriber can provide information for the subscriber information database and can also receive reports from system 100 via subscriber device 112, which may be a computer or server with software, preferably set up for cloud data storage. Subscriber information database 104 contains information about the system subscribers. Item database 106 contains information in the form of landing pages and flyers relating to one or more items, such as items for sale. The structure of database 106 may be tailored to the type of products or services it contains. For example different database structures would be desirable consumer products and services being offered for sale (Example 7 below), for real properties being offered for sale (Examples 8 and 9 below), for automobiles being offered for sale, for other for a wagering system (Example 10 below), and for an emergency response system (Example 11 below).

Customer database 108 contains information about customers who have opted into receiving item information, including email addresses and/or telephone numbers and possibly a digest of the customer information, as discussed below. Contact database 110 contains telephone numbers and email addresses of contacts who have been identified by a customer and who have opted into receiving item information.

Server 102 is also in communication with a message handler 114. Message handler 114 is operative to receive incoming messages either directly from a customer's electronic device 116, such as a phone, tablet, or computer, or from the customer's device via an IVR 118. After the message handler 114 receives an incoming message via IVR 118, further communications between the system 100 and the customer's device 116 bypass the IVR 118. As explained below, the message handler may also be able to communicate with a contact device 120, which may be different from the customer's device 116.

Each database 104, 106, 108, or 110 shown in FIG. 1 may comprise multiple databases to allow the system to provide immediate responses to customers and contacts and to operate without encountering unacceptable communication delays. For example, the subscriber database 104 may comprise multiple databases, each containing information for a group of subscribers or even a single large subscriber which may have multiple offices and multiple agents in each office. The item database 106 may be similarly divided into separate databases for items offered by groups of subscribers or single large subscribers. The customer database 108 and contact database 110 may each comprise separate databases for customers and contacts with phone numbers and for those with email addresses. These databases may be further subdivided as needed to provide rapid system responses.

The system provides to a subscriber an IVR number, phone number, Short Code, and Computer Network address (i.e. URL) for use in connecting the customer to the system. The IVR system may be subscriber-programmable and have its own database 120 with the customer-programmed responses for each IVR number and telephone number, as described in application Ser. No. 12/378,922. For example, the IVR may be programmed to respond to an incoming phone call with a message such as "Thank you for calling X," where X is the subscriber, and send a code message on to the message handler. The system then sends a message directly to the customer, generally with an option to opt in to receive additional information. Alternatively, the IVR may be programmed to have a further exchange with the caller, such as sending an outgoing message, "Thank you for calling X. If you would like to speak to an agent, please press 1. If you would like to receive additional information via a text message, please press 2. If you would like to receive additional information via an email message, please press 3." In this case, if the customer selects option 1, a text or email message is sent to the agent. If the customer selects option 2, the system responds by beginning a Session Method interaction. If the customer selects option 3, the system begins a Session Method or URL Method interaction.

The subscriber provides one or more landing pages and flyer pages, which are URLs with information the subscriber wants to disseminate to potential and actual customers. The landing and flyer pages may each contain one or more links to additional flyer pages and are stored in item database 106. The subscriber may also customize landing and flyer pages. For example, if the subscriber is a nationwide organization with offices in New York, Chicago, and Denver, the pages may be customized to show the New York skyline for the New York Office, the Chicago skyline for the Chicago office, and the Denver skyline for the Denver office. If there are multiple agents in each office, the pages can be further customized for each agent. For example, an agent working out of a Denver office but serving clients in Summit County, Colorado, may choose to display a ski slope. In addition, tag lines in the display can be changeable for specific offices or agents, depending upon the wishes of the subscriber. The multiple offices and/or agents of a customer may share a common IP address and domain name. In addition, the system may provides to the customer the ability to edit the content of landing and flyer pages to include key words or tags for search engine optimization, without the need for a specialized programmer.

Message handler 114 is able to receive and send telephone, text, and code messages with the same high priority assigned to voice messages by telecommunications carriers, as described in U.S. Pat. No. 7,643,821 and application Ser. No. 13/536,847. This allows the system to respond quickly to requests for information from customers. In addition, message handler 114 is able to format outgoing messages for appropriate display on whatever telecommunications device they are sent to, without any limit to the number of characters that may be included in each outgoing text message. Although the subscriber provides the information to be displayed, the message handler 114 can rearrange and resize the display for viewing on a customer's or contact's device. When a customer sends an incoming message, the system 100 determines which type of device 116 the customer is using and then immediately reformats the outgoing information for the customer's device. This eliminates the need for a customer to download an "app" to receive information. Preferably, the system 100 stores information with the specifications of each type of device it has previously encountered. If it doesn't recognize a device, it may search on the internet to obtain the specifications and then respond to the customer, or it may periodically search the internet to obtain the specifications of new devices as they come on the market and be ready to manage messages from each new device.

If a customer makes a voice call to the system or sends a text message, the system 100 uses the Session Method and responds to the initial incoming message via the telephone port of customer device 116. If the WAP port is used to initiate the interaction, the system may also use the Session Method. In the Session Method, server 102 stores lead information, including the customer's telephone number or email address and the identifications of the pages a customer views, in a customer session so that it can be continuously referenced during the session. The session method makes use of the capability to interact with multiple open ports of user device 116, as described in patent Ser. No. 13/536,847, particularly if the customer made a voice call or sent a text message to initiate the interaction. The first time a customer clicks on a link after initiation of the session, the system 100 makes sure the WAP port of device 116 is open, opening the port on device 116 if the interaction began with a telephone call or text message. If the phone port of device 116 is open, the system 100 will close it after the first time the customer clicks on a link, which opens the WAP port.

If the customer requests a page through a URL, i.e., device 116 has an open WAP port, such as if the interaction were initiated via an email message or code (as described in application Ser. No. 13/536,847), the system may use the URL Method to track leads. In the URL Method, lead information including the customer's network address is stored in URLs. When the customer requests a page, lead information is sent along with that page request. For each page that is requested through a URL with an embedded reference to customer information, the system 100 embeds that same reference into the URLs of all links on the requested page, so that the reference is propagated through subsequent clicks on those links. The system 100 places a reference to identifying information about a customer into the URL for a page. Each time the customer loads an URL, the system receives both the information about the requested page and the reference to information about the customer who is requesting it, and so can create a new lead with that information.

The system may be configured to use the Session Method for incoming telephone and text messages and the URL Method for incoming email and code messages. Alternatively, the system may use the Session Method for handling all incoming messages. The Session Method provides greater security than the URL Method.

In either a Session Method or an URL Method interaction, the system may provide the customer with an option to allow the system to geolocate the device 116. If the customer opts in for location, the system opens the WAP locating port of the device (used for GPS). The location of the device 116 can be determined by triangulation using signals from nearby wi-fi sources or the closest cell tower. Using wi-fi sources, the system can determine the precise location of the device 116 and follow it when the customer moves.

The lead information received by system 100 can be propagated through a series of interactions between the system and a customer in either the Session Method or the URL Method, depending upon whether the initial connection to the system was via the phone port or the WAP port of customer device 116. After creating the initial lead, the system may use the customer's identifying information, including the customer's phone number and/or network address to create new leads for every subsequent flyer page that the customer views. In this way, the customer's information may be tracked throughout the customer's visit to the site, allowing a lead to be generated for every landing and flyer page that the customer visits and clicks on a link. These tracked leads can be reported to the subscriber.

In addition to tracking leads from customer-initiated interactions, the system 100 can track leads that are generated during subscriber-initiated interactions (blasts). In a subscriber-initiated interaction, one or more contacts have already provided their contact information to a subscriber, and the subscriber selects contacts, to each of whom a text or email message is sent containing a link to various pages. The contacts may be customers or people referred by customers via a "share" feature. The link also has a reference to the customer's information embedded in it, with the information tied to the customer's telephone number (text message sent) or network address (email message sent). When the customer opens the link, the customer's information is passed back to the system 100, and the customer receives a page containing links to other pages. If the customer clicks on one of the links to request another page, the system uses the customer information to create a lead recording that the customer viewed that page, and then will reference that lead to create new leads for additional page views.

The session and URL Methods can be used in customer-initiated and subscriber-initiated interactions. In a customer-initiated interaction, a customer makes the initial connection to the system, generally in response to a subscriber's advertisement, and information is provided immediately to the customer's device 116.

In addition to providing the customer with an opportunity to opt into receiving further information during the session, each landing or flyer page may also provide the customer with an opportunity to receive additional information after the conclusion of the session. For example, if the customer is looking at real estate, he or she can send an opt in message requesting that he or she be kept informed as new information becomes available. That information could be about the property, such as a change in the offering price; it could be about other nearby properties in the same price range; or it could be about services a prospective buyer might be interested in, such as title insurance, home inspections, repair and maintenance services, etc. The customer can request that the new information be sent to his or her device 116 from which the session was started, or the customer can request that the new information be sent to another device, such as contact device 120 in FIG. 1. The "contact" may be the customer or someone else whom the customer has identified. System 100 stores contact information separately from customer information to reduce delay times and enhance system performance. The leads generated during an interaction may be reported to the subscriber. Preferably, email leads are reported separately from telephone leads. Email lead reports may include the customer or contact email address, the identification of the clicked links, and the date and time each link was clicked.

Many internet-based systems, including social media sites like Facebook and Twitter, include a "share" button. In a conventional system, a share button, when clicked, would send an email with a link to a property product or service web site to a designated person. The email usually includes a statement such as, "A friend thought you would like to see this!" Such "share" buttons are attractive to marketers, who view a friend sharing information with another friend, similar to a word of mouth referral, as a very powerful means of attracting business. This is a desirable feature for marketing purposes; if one customer receives a text or email from a subscriber via the blast system with a property or product link and send it to three friends, and they send it to three more friends each and so on, then by the fourth level down that one lead could generate up to 243 leads. Until now, "share" email messages have been untraceable. Also, until now "share" buttons have not been used to distribute information via text (SMS-formatted) messages.

The system 100 may provide a "share" button on every page. Thus, if someone wants to share that website, property listing, product, or service information page, a click on the button will produce a drop-down or pop-up window into which the user can enter an email address or phone number for each person to whom "share" messages will be sent with the information to be shared from that website or listing or product page.

For example, a drop down window might present the following form:
From John Doe
Email _____ (John Doe could enter his email address here)
Or Cell phone number _____ (John Doe could enter his cell phone number)
Send to _____ (John Doe could enter "Steven Smith" here)
By email _____ (John could enter Steven Smith's email address)
Or send by Text (SMS) message _____ (John Doe could enter Steven Smith's cell phone number)

The drop down window may include an "add more shares" drop down or pop up button, which can be clicked to provide contact information for another party (a "contact") with whom the information may be shared. Thus, John Doe can send the information to more than one person. For each person whose contact information has been provided, the system 100 then sends a text or email message to that person's mobile phone number or email address though message handler 114, making every link traceable in the same manner as a subscriber-initiated text or email blast with a link to the page to be shared. Shared party information may be stored in yet another database. The shared information for the friend is then put into the data base reporting systems one for email and text message leads reports.

The friend may opt in to receive additional information by clicking the link and opting in. Because the friend did not request the link to the shared information, the friend becomes a new contact for subscriber-initiated interactions, and the system may send an opt-in email or text message if the friend doesn't respond to the shared information link message. It may be desirable to set a time limit which must pass before the system sends the opt-in message, for example 24 hours, to see if the friend initiates a contact with the system. If the friend does not click on the link within the time limit, the system may then send the opt-in email or text message. If the friend does not respond or opts out, the friend's contact may remain in the system but will not be available for sending outgoing messages from the system. If the friend clicks on a link, the email or telephone lead is reported to the subscriber, with the reported information including the customer telephone number or email address, the contact's telephone or email address, the identification of the clicked links, and the date and time each link was clicked.

The part of the system that handles "share" information can also be used to generate "cleaned" lists from purchased "customer" lists. Each "customer" on the list can be sent an opt-in text or email message, and the list can then be purged of contacts who don't opt in to receive additional information.

In a subscriber-initiated interaction, a customer has indicated a desire to receive information sent to his device 116 and/or requested that information be shared and sent to a contact device 120, and information is provided at some later time to the designated device 120 via a text and/or email "blast." Device 120 may be the same device as customer device 116, or it may be a different device. For example, a customer may initially contact the system using a telephone but may want additional information sent to his or her laptop or to a family member's phone. Alternatively, the customer may have interacted with the system by sending in one type of message but prefers to use a different type of message for subsequent interactions, e.g., an initial contact via a text message and subsequent contacts via email. Preferably, there are separate databases for contacts and leads, indicated generally as customer database 108 and contact database 110 in FIG. 1.

To set up a subscriber-initiated interaction, a system subscriber creates a text or email blast or both by selecting some of its landing and flyer pages from item database 106 and selecting contacts from customer and/or contact databases 108 and 110 to whom the blast will be sent. For subscriber-initiated text blasts, the messages are passed between the system and the contact with the same priority normally given to telephone calls, as described in U.S. Pat. No. 7,643,821.

Each blast contact has previously opted in to receive messages and has provided his or her phone number or email address or both. Blast contact identifications are stored in the contact database 110 with the contact phone number and/or email address, and preferably also a hash digest. The hash digest is an encrypted string of numbers and letters that is created by hashing information unique to the contact, and so each contact's digest will uniquely identify it.

System 100 formats outgoing information for the specific type of device 116 or 120 that will be receiving the message, as described in U.S. Pat. No. 7,643,821. In addition, the landing and flyer pages in the links are formatted for the particular device. This applies to the outgoing text message layout/format as well as the landing page for the link. It should be noted that the content of the web pages is determined by the subscriber; the system 100 reformats the word and image layout so things fit on the screen and are legible. Further, if the customer or contact has opted into geographic location via the WAP locating port, the content of outgoing landing and flyer pages can be customized for the location of the customer or contact.

The system of the present invention can be used in conjunction with comarketing arrangements in which multiple subscribers agree to provide links to each other's landing and/or flyer pages. Thus, the system generates leads in a manner that promotes brand recognition. Comarketing arrangements may arise when multiple parties all agree to work together and then individually subscribe to use the system. Alternatively, existing subscribers may be presented with an option to make their participation known to other subscribers, and an agreement may be created after the subscribers are identified to each other by the system.

In the description above, the flyer pages presented to a customer or contact may include links to pages of a comarketer, with the comarketer's pages included as "flyer pages," even though a comarketer page may be a home page for the comarketer. Because the system tracks leads through each page link that a customer or contact views, the leads can be reported to each subscriber in the comarketing arrangement. The leads may be reported only to the subscriber whose page was viewed, with each comarketer only receiving information about who accessed its own pages. Alternatively, it may be desirable to receive leads for the entire interaction between the system and the customer or contact. For example, if a real estate agent has a comarketing arrangement with a lender, a home inspection service, and home repair service, the real estate agent will know that a customer or contact is seriously considering a home purchase if the contact also clicks on links to pages of these additional service providers. The lender and the home inspection service may find it helpful to know how many leads are arising from the comarketing arrangement with that real estate agent.

Although each customer and each contact has a unique database ID, it is preferable to use an encrypted digest to represent the customer or contact information in URL's that are transmitted back and forth during customer and contact interactions with the system to increase the system security. Also, the Session Method provides greater security than the URL method.

The system preferably includes options on landing and flyer pages to opt in for additional information. Having the customer or contact opt in avoids transmission of undesired spam, yet allows the interested customer or contact to receive additional information immediately and/or at a later time via subscriber-initiated contacts.

Each outgoing message from the system to a customer or contact device may include an opt-out feature to instruct the system to discontinue sending information to the customer or contact. For example, the opt-out feature may include a phone number and a code. The phone number is a number associated with the system IVR, and the code is associated with a particular subscriber or subscriber's agent. Thus, if the subscriber has multiple agents, a single phone number can be designated for opting out of communications with all agents, with a different code associated with each agent. The system then removes the customer or contact from the lead database(s), automatically and without involving the subscriber. The system may keep a record of when each customer or contact opted in and opted out. A similar opt-out system may be used with email messages.

The lead tracking performed by the system allows a subscriber to find out the phone number and/or email address of each customer and contact who has opened the link(s) on the subscriber's landing and flyer pages, plus the other pages the customer or contact looked at. This feature may be used by a subscriber to determine the effectiveness of email and text blast campaigns.

It should be noted that whenever an interaction occurs between the system and a customer or contact, the system responds rapidly.

Example 1

Customer-Initiated Lead Creation

Figure 2:
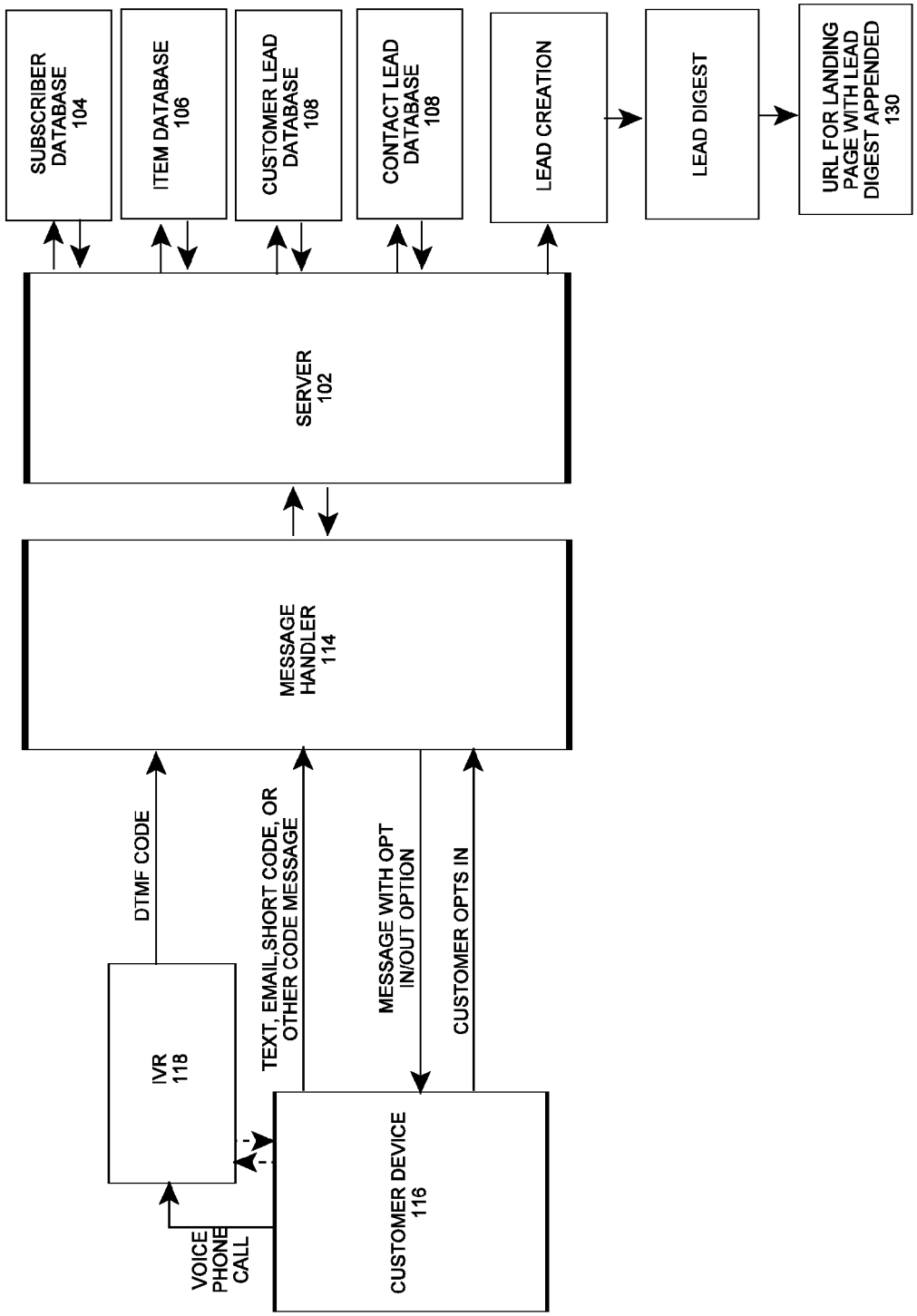
FIG. 2 is a block diagram showing a lead generation process in accordance with the embodiment of FIG. 1.

During a customer-initiated interaction with the system, an initial URL with an appended lead digest may be created as shown in FIG. 2. A customer may use device 116 to make a telephone call to IVR 118 or to send a text message into system 100. If the customer makes a telephone call, it is received by IVR 118, which in turn sends a DTMF coded message to message handler 114. Depending on how IVR 118 is programmed, it may send an opt-in message to device 116 and then, if the customer opts in, send the DTMF code message to message handler 114. If IVR 118 is programmed in a way that it does not send the opt-in message back to device 116, it sends the DTMF code message directly on to message handler 114. In this latter case, or if the customer sends an email or code message, system 100 sends an opt-in message to device 116. The customer has the choice of opting into receiving additional information or opting out. The customer may also be given the choice of contacting the subscriber or an agent of the subscriber.

If the customer opts into connecting with the subscriber, a message is sent to the subscriber or the subscriber's agent as described in application Ser. No. 13/536,847 and/or U.S. Pat. No. 7,643,821.

If the customer replies by opting into receiving information from the system 100, the message handler 114 sends a message to server 102 containing a request from the customer to view the subscriber's landing page and the customer's identifying information, including the customer's telephone number and/or email address. Server 102 obtains the subscriber's landing page URL from item database 106 and also obtains any lead information from prior interactions between the customer and the system that may be present in the customer database 108. Server 102 then creates a lead that contains three main parts: the identifying information about the customer (telephone number and/or email address), the identifying information about the page requested, and the date and time of the request.

Server 102 then creates a lead digest, which is a hashed a representation of the lead having the form of a string of letters and numbers that are unique to that lead. Then server 102 creates a URL 130 for the subscriber's landing page, with the lead digest appended to the URL.

Example 2

Customer-Initiated Lead Propagation Via Session Method

A session comprises a small amount of data that are kept by server 102 during a connection between the custoer device 116 and the system 100. Each time a customer initiates contact with the system 100, the system opens a session that is tied uniquely to the customer's connection and persists until the customer closes all system web pages and terminates his or her connection to the system server 102. The system 100 uses the session to track leads by storing the identifying information of the customer who is viewing the site in the session, if such information has been made available, and creating leads with that information for every page the customer views while the session exists. If it is the first time the customer initiates contact, a new session is created, containing the customer's phone number and the identification of the items (subscriber landing and/or web pages) the customer views. If the customer is re-contacting the system, the stored session from the previous interaction is retrieved from the customer database 108 and re-opened.

Figure 3:
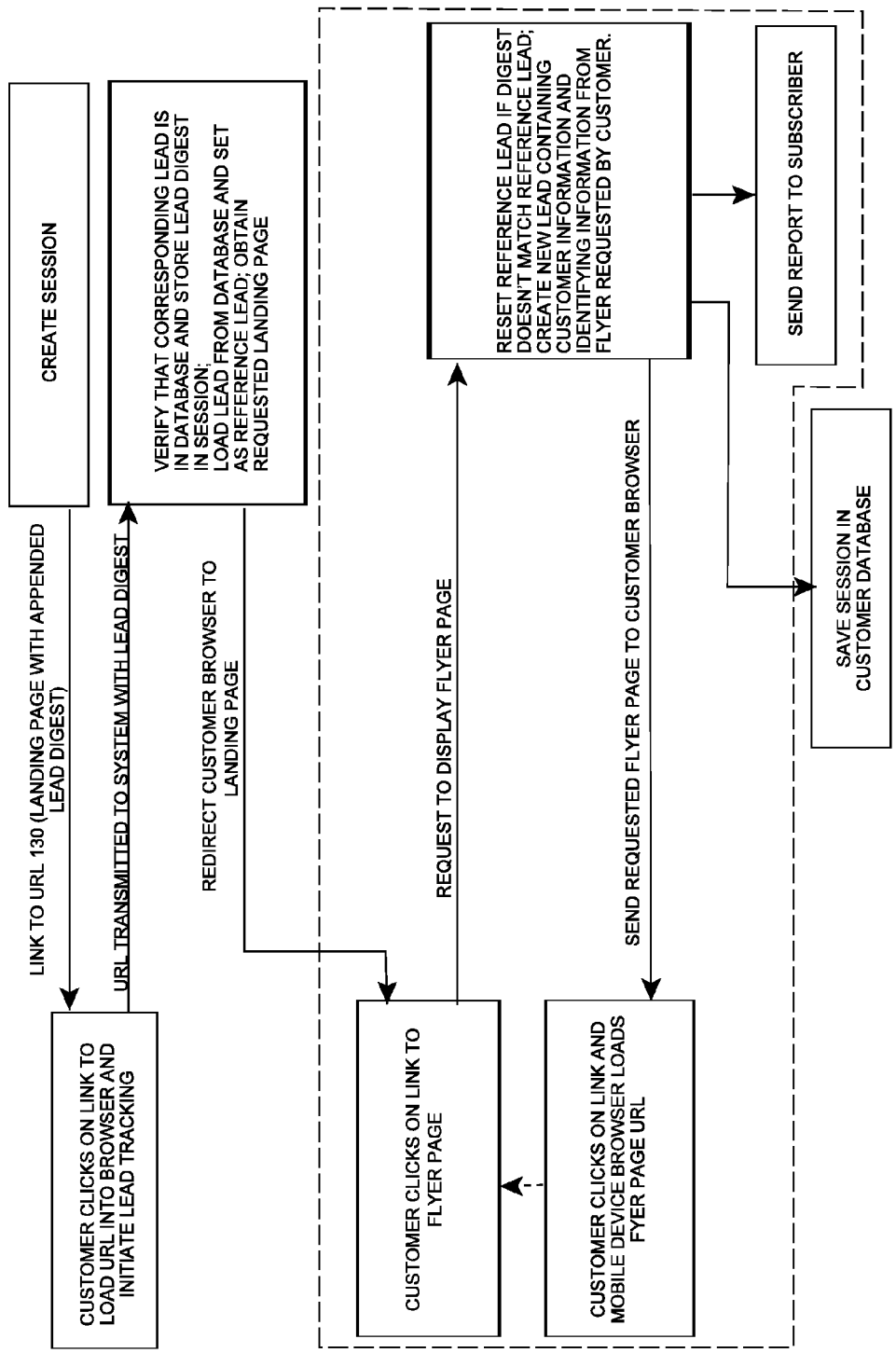
FIG. 3 is a block diagram showing a lead propagation process in accordance with the embodiment of FIG. 1.
Figure 4:
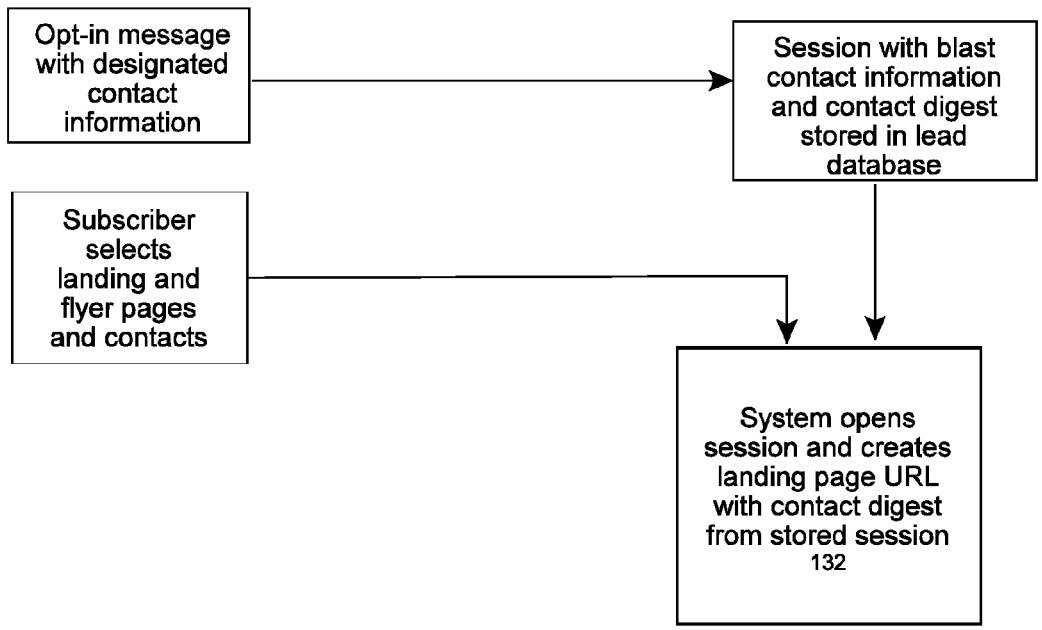
FIG. 4 is a block diagram showing a process for generating leads via a blast message in accordance with the embodiment of FIG. 1.

As shown in FIG. 3, propagation of the lead information though subsequent interactions between the system and the customer begins when the system 100 sends a message including a link to URL 130 to customer device 116. If the customer clicks on the link, the customer device browser loads the URL 130 and then transmits it back to the system with the lead digest. Server 102 then looks up the corresponding item in the customer database 108 and verifies that the corresponding lead is in the customer database 108. The server 102 then stores the lead digest in the session, loads the requested lead from the customer database 106 and sets it as the reference lead in the session. A message which includes a link to the URL for the subscriber's landing page is sent to the customer device 116 and redirects the customer's browser to the landing page. The customer views the landing page and clicks on a link to a flyer page. The landing page sent may also include a box or form to be filled in by the subscriber to opt in for receiving additional information and a "share button" for providing contact information to the system 100. The landing page may also include a box to be checked to allow GPS location of the customer device 116. The location of the customer device 116 may be used subsequently by the system to provide additional information that is geographically associated with the customer's location; in the case of real estate, the additional information could include nearby properties for sale or the locations of churches, parks, or schools.

A request to display the selected flyer page from item database 106 is sent to the system 100, and the server then checks whether the digest matches the digest of the reference lead. If the lead digest from the incoming message matches the lead digest in the session, then the reference lead remains the same. If there is a mismatch between the two lead digests, or if no reference lead has been set, then the system looks up the lead in database 108 that corresponds to the incoming lead digest and sets that to be the reference lead in the session. Once it has been determined that an appropriate reference lead is set in the session, information from that lead is used to create a new lead in database 108 containing the customer's information and the identifying information of the flyer page that the customer has requested to view. Having created this new lead that records that the customer requested to view the flyer, the system then sends to the customer's browser a message including a link to the flyer URL with the lead digest appended.

This process may be repeated for each subsequent flyer page that the customer requests to view, until the customer closes his or her connection and ends the session, indicated by the area enclosed in dashed lines in FIG. 3. While the connection and session are active, every time the customer clicks on a link to a system landing or flyer page, the system receives a request for the page, uses the stored customer information to create a new lead that contains the customer's information and the identifying information of the flyer page requested, sends the requested page to the subscriber's browser, and sends a lead report to the subscriber device 112. When the customer ends the session, the session information is stored in the customer database 108, including information about the customer and which of the subscriber's landing and flyer pages the customer viewed during the session. The subscriber may view the lead report whenever desired.

Example 3

Subscriber-Initiated Lead Creation Via Session Method

For a subscriber-initiated (blast) interaction with one or more contacts using the Session Method, the server 102 prepares a subscriber-initiated text or email message by creating a link to the subscriber's designated landing page URL in item database 106 that will display all links to all of the flyer pages that the subscriber selected to be in the blast. Then, for each contact selected to receive the blast via text message, the server 102 retrieves the contact digest from contact database 110, appends the contact digest to the end of the URL, and sends a text or email message containing a link with the URL to the landing page and the lead digest for the contact.

The contact device 120 then receives the blast message, the contact clicks on a link in the message, and the device p-browser loads the URL. The URL with the appended contact digest is then transmitted back to system 100, which re-opens the session that was previously stored for the contact, obtains the contact digest from the message, and stores it in the session. The server 102 then obtains the information identifying the selected landing and flyer pages from the URL and redirects the customer's browser to a landing page 132 that displays links to all of the subscriber-selected pages.

Example 4

Subscriber-Initiated Lead Propagation, Session Method

Figure 5:
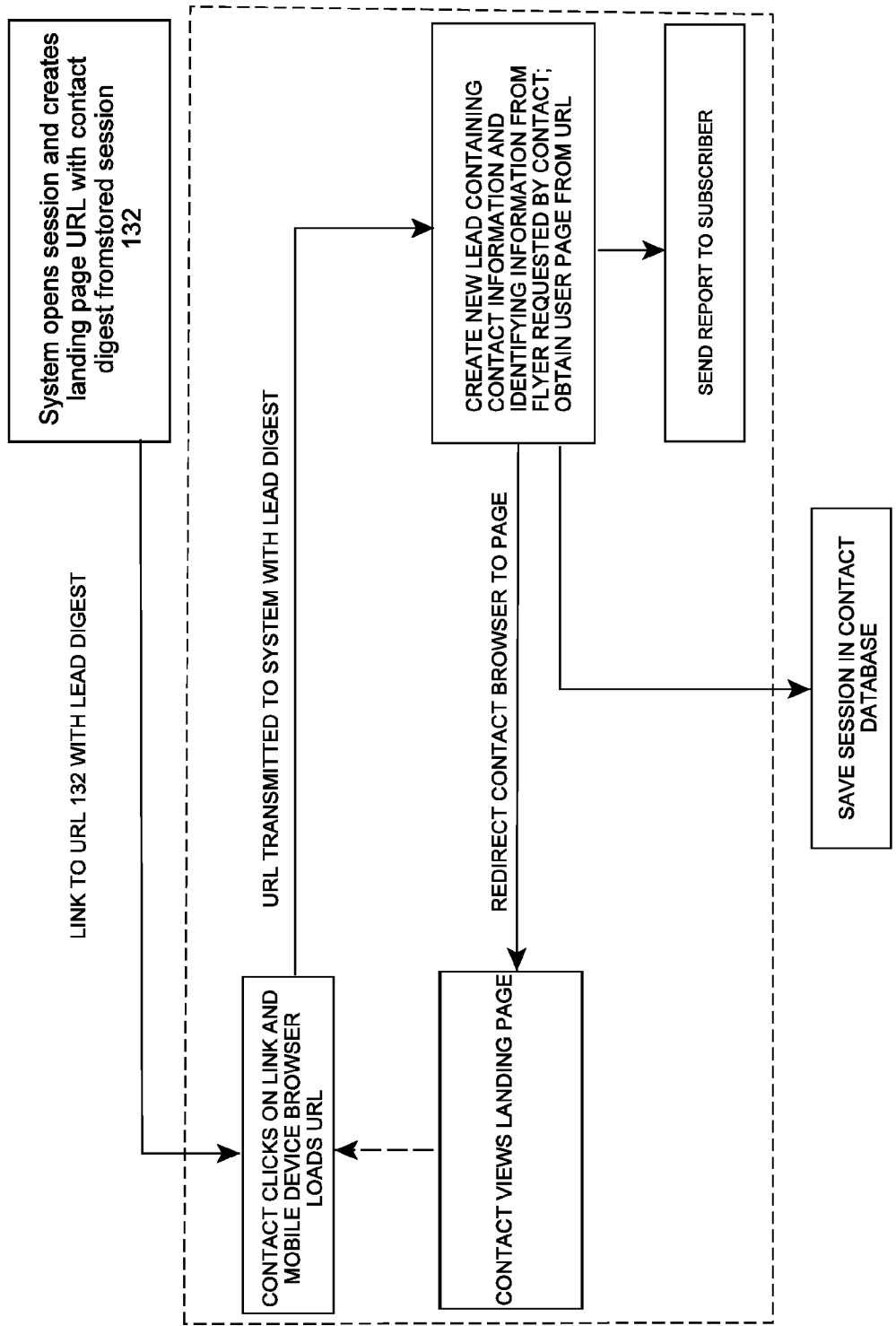
FIG. 5 is a block diagram showing a process for propagating leads via a blast message in accordance with the embodiment of FIG. 1.

Referring to FIG. 5, the contact may view the landing page 132 with the multiple links to flyer pages. If the customer clicks on one of the flyer page links, a request is sent to the server 102 to display that page. The server 102 receives the request to display the page and uses the digest to look up the contact in contact database 110. Once the contact is found, the server 102 uses the phone number and/or email address of the contact to create a lead containing the contact's information and the identifying information of the page requested, sets that lead to be the reference lead in the session, and stores the digest of that lead in the session. The server then sends the requested page to the contact's device 120.

Each time the contact clicks on a link to a flyer page or additional landing page, the process of checking and updating the reference lead is repeated, and the identification of the contact and the page viewed are reported to the subscriber device 112. When the interaction with the contact is terminated by the contact, the session is closed ans saved contact database 110.

Example 5

Customer-Initiated Lead Propagation Via URL Method

Figure 6:
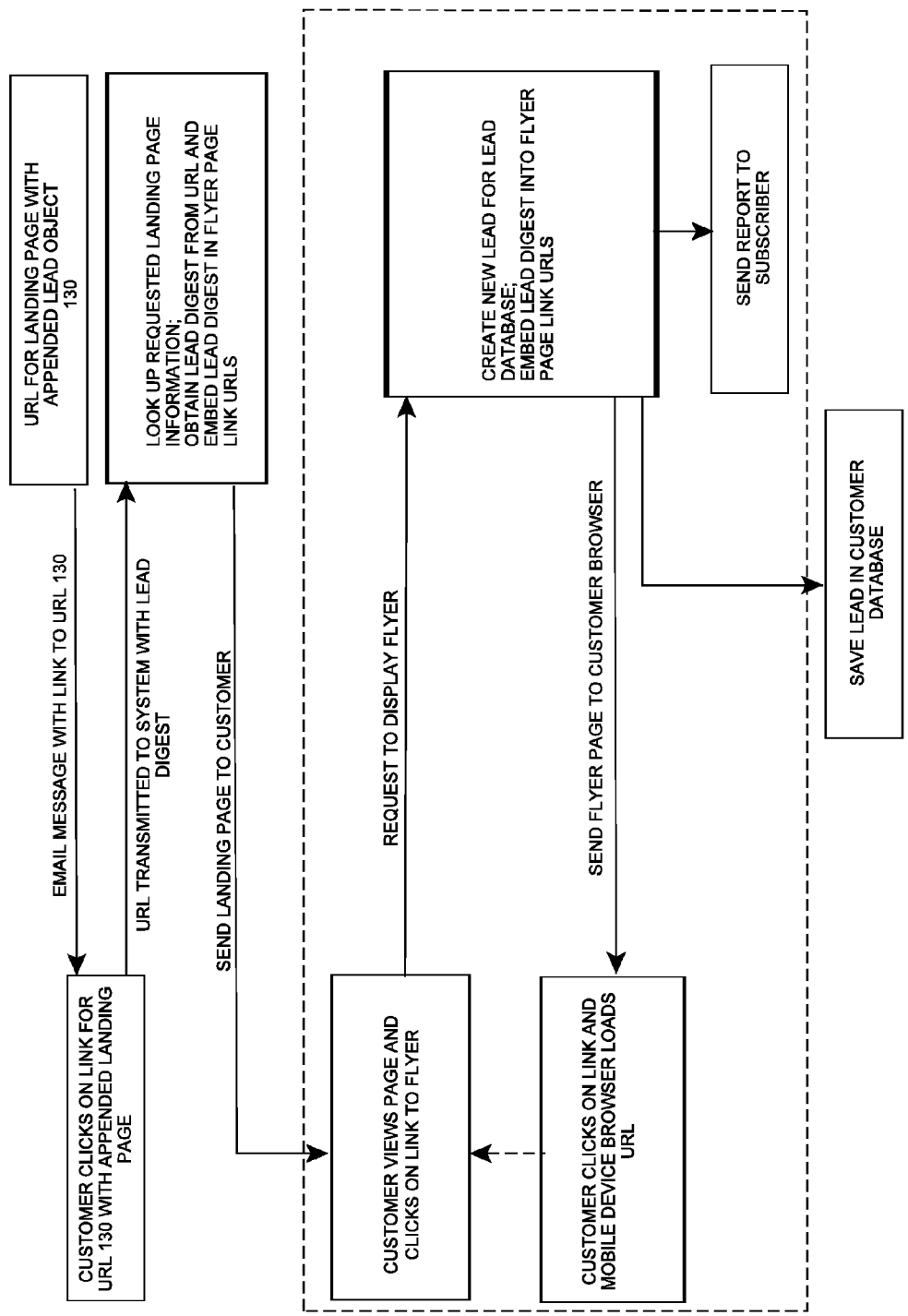
FIG. 6 is a block diagram showing a process for propagating leads using an URL tracking method.

If the customer initiates an interaction directly with the system by sending a an email message or code via the WAP port of device 116, the system 100 may handle the interaction via the URL Method. For a customer-originated contact, the initial lead in the URL Method is created as described above with respect to FIGS. 1 and 2, via a customer sending a message directly to message handler 114, but the lead includes the customer device's network address and not its telephone number. As shown in FIG. 6, after the customer has opted in for receiving additional information immediately via system 100, an email message with a link to URL 130 with the appended lead digest is sent to device 116. If the customer clicks on the link, the system receives the request for the landing page along with the lead digest. The system then obtains the requested landing page from the item database 106, embeds the lead digest into any links included in the landing page, and sends a message to the customer's device with a link 130 (in FIG. 2) to the landing page.

If the customer views the landing page and then clicks on a link to a flyer page, a request is sent to the system 100 to display the flyer page. The system 100 looks up the lead corresponding to the digest in the lead database, creates a new lead containing the customer's information and the flyer identification, and embeds the lead digest into the URLs associated with each link of the flyer page. The system 102 then sends the flyer page to the customer's browser in device 116. If the customer clicks on a link to an additional flyer page, the system again checks for an embedded lead digest. If there is a lead digest, the system again appends the lead digest to any URL associated with links in the newly requested flyer page and creates a new lead in the lead database. The system sends the requested page to the customer's browser. Thus, each time the opted-in customer clicks on a link to a URL with the embedded lead digest, the system generates a new lead. Each time the customer clicks on a link to a flyer page, a lead is reported to the subscriber device 112, identifying the customer and the item pages (URLs) the customer accessed. Each lead is also stored in customer database 108.

Example 6

Subscriber-Initiated Blast, URL Method

Figure 7:
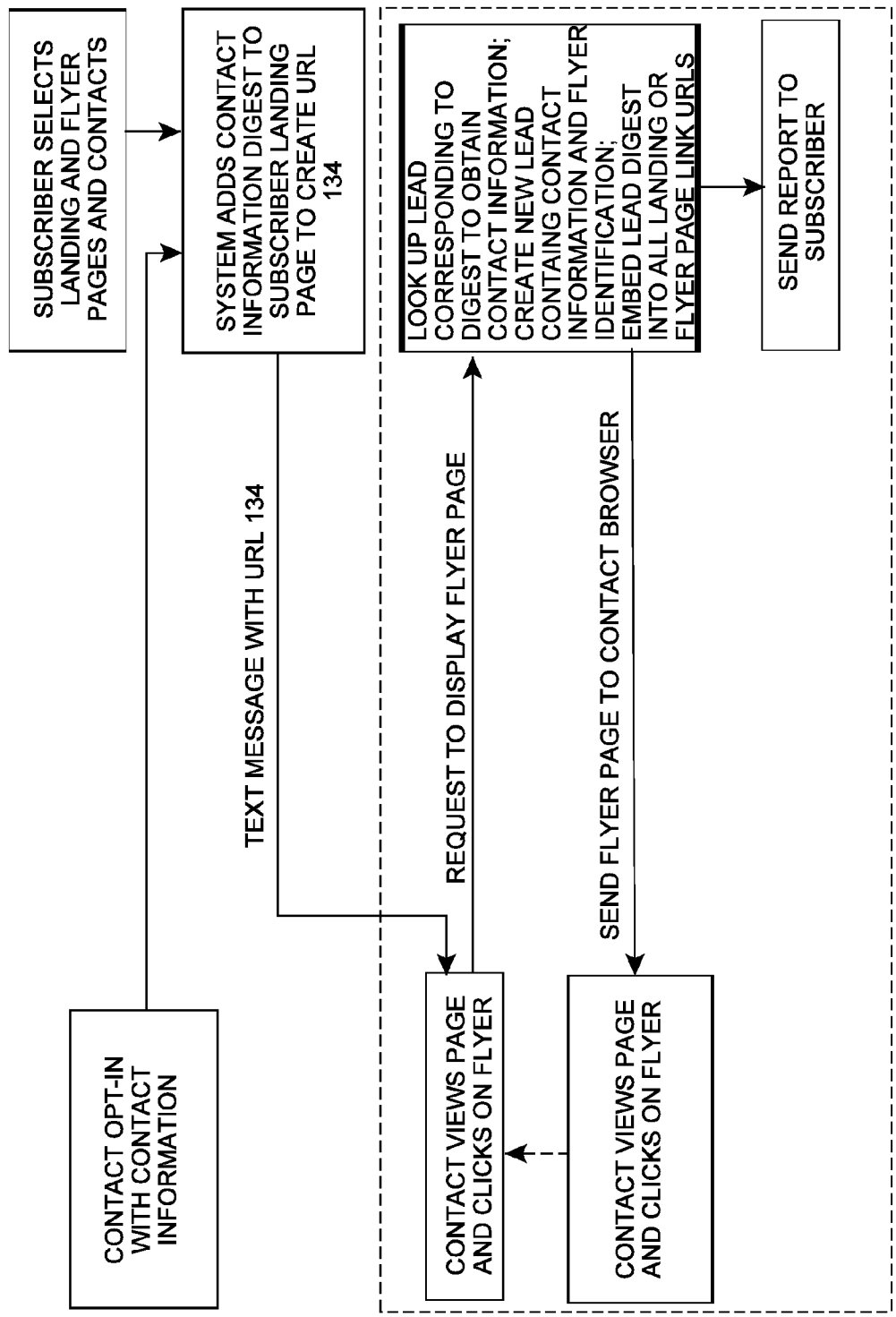
FIG. 7 is a block diagram showing a process for generating and propagating blast leads using an URL tracking method.

The URL Method can also be used for sending email blasts initiated by the subscriber, as shown in FIG. 7. When a customer has opted into receiving email messages, either at the device from which he or she originally contacted the system, or at the device he or she designated with the opt in message, the blast contact information is stored in the contact database 110 with the name and phone or email of the contact as well as a hash digest.

As with the Session Method, the subscriber selects landing and flyer pages and contacts to receive the blast message. As described above, the hash digest is an encrypted string of numbers and letters that is unique to the contact, and so each contact's digest will uniquely identify it.

The system 100 prepares the blast by creating a URL to a page that will display all of the selected landing and flyer pages that the subscriber selected to be in the blast. Then, for each contact selected to receive the blast, the server 102 appends the contact's lead digest to the end of the URL and sends an email message containing a link with the URL with contact's phone number or email address.

A selected contact receives the text or email blast message and clicks on the link in the message, and the browser on their device loads the URL. The system 100 then obtains the information identifying the selected landing and flyer pages from the URL and prepares a landing page URL 134 that displays links to all the selected flyer pages, with the contact digest embedded in each flyer page URL link on the landing page.

If the contact views the landing page of URL 134 and clicks on a flyer page link, a new request is sent to the system to display the flyer page. Server 102 looks up the lead that corresponds to the lead digest, obtains the customer's identifying information from that lead, and uses that information to create a new lead containing the customer's information and the identifying information of the flyer page that the contact has requested to view. Server 102 then embeds the lead digest from the URL into all landing or flyer page link URLs on the requested flyer page before sending the requested page to the contact's browser.

This process is repeated for all subsequent landing or flyer pages that are accessed through a URL that has an embedded lead digest. Every time a landing or flyer page is requested through a URL with an embedded lead digest, system 100 receives a request for the page, uses the lead digest to look up the corresponding lead and get the contact's information from it, creates a new lead using that information and the identifying information of the requested page, embeds the lead digest into all the page link URLs on the requested page, and then send the requested page to the customer's browser. A report may be sent to the subscriber showing the identity of the contact and the identity of the pages whose links the contact clicked on.

Example 7

Customer-Initiated Interaction, Products Advertised by Multiple Agents

Figure 8A:
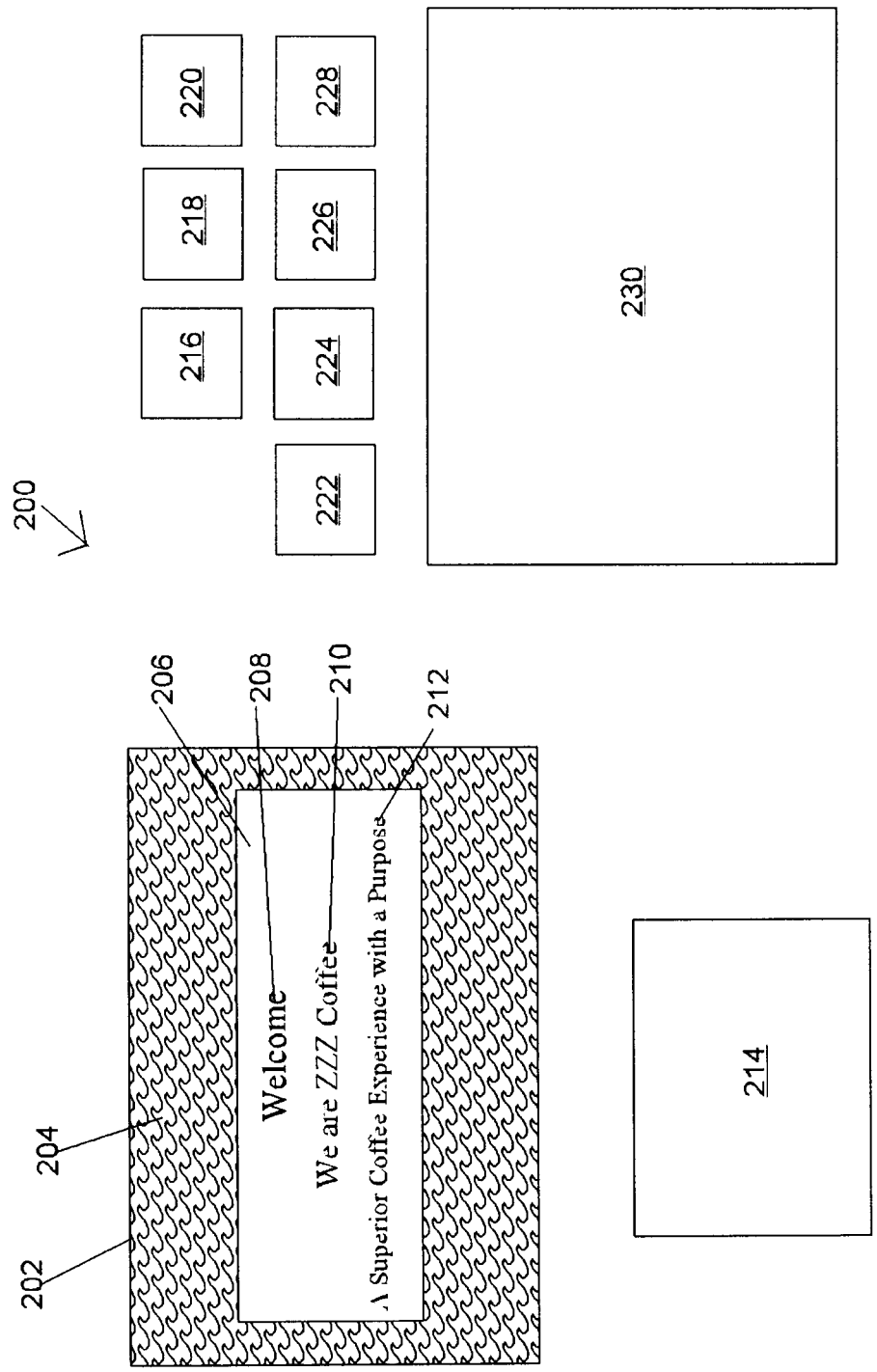
FIGS. 8a and 8b are screen shots of a landing page for a customer-initiated interaction with an embodiment system in accordance with the present invention.
Figure 8B:
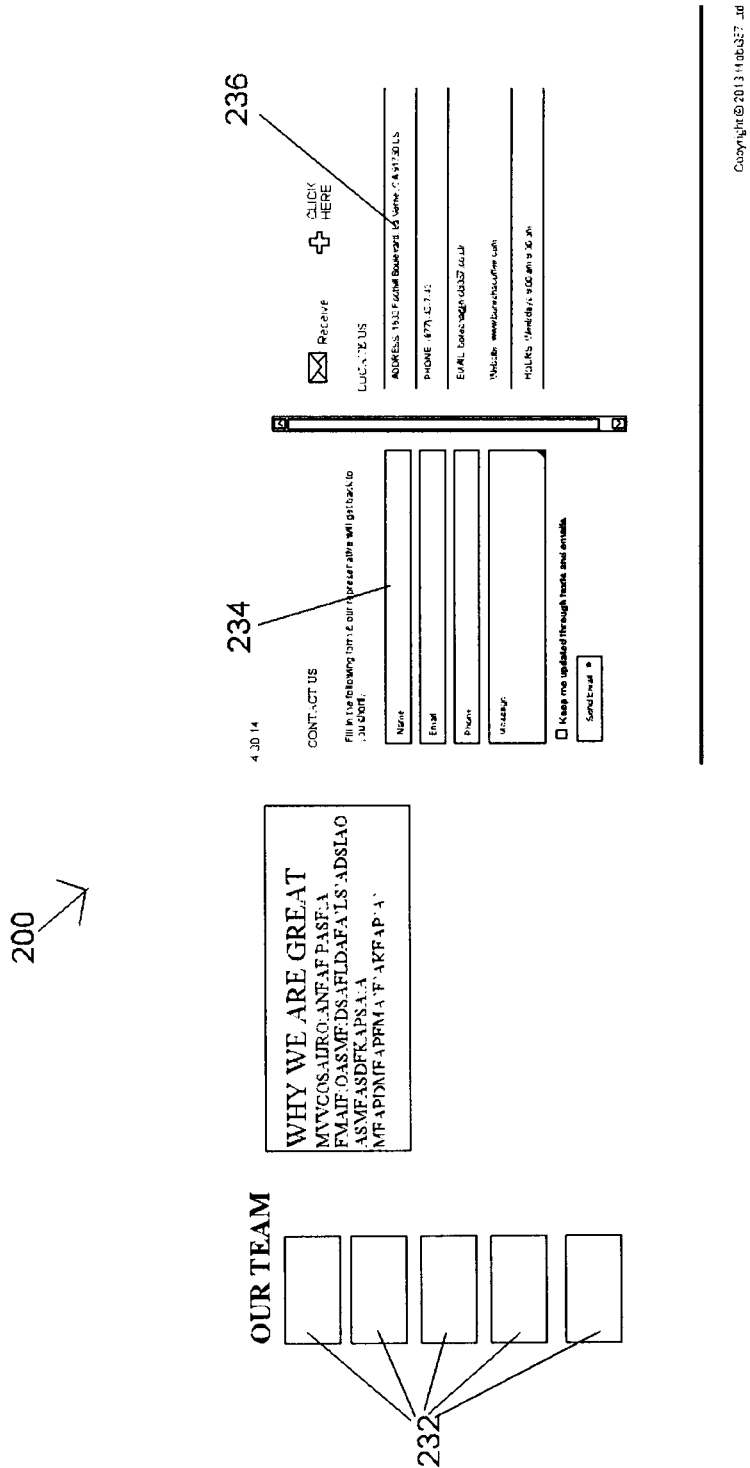

A landing page 200, set up for use with an embodiment of the system of the present invention, is shown in FIGS. 8a and 8b, using a coffee merchandiser ZZZ as an example. For simplicity in explanation, parts of the web page 200 are shown side by side, but the parts would be displayed one above the other, with the viewer able to scroll down the page. At the top of the page, shown on the left side of FIG. 8a, is a graphic 202 with a background 204 and a box 206 with tag lines 208, 210, and 212. Background 204 and tag lines 208, 210, and 212 are each customizable by the subscriber or possibly by individual offices and/or sales agents of the subscriber. Below the "banner" is image 214 of a featured product, and on the right side of FIG. 8a are images 216, 218, 220, 222, 224, 226, and 228 of product packages, and a generalized description 230 of ZZZ products. Each image is a link to a flyer page with more detailed information about that product. Images 232 of the ZZZ management team are below the product images, shown at the left side of FIG. 8b, and these images are also links to flyer pages that provide background information for each manager. On the right side of FIG. 8b is a form 234 that can be filled out by a page viewer who is interested in receiving a follow-up email message from a sales agent and a "share" button 236 labeled "Receive". ZZZ sales agents 232 work out of their homes, and their addresses are not provided on the web page.

Figure 9:
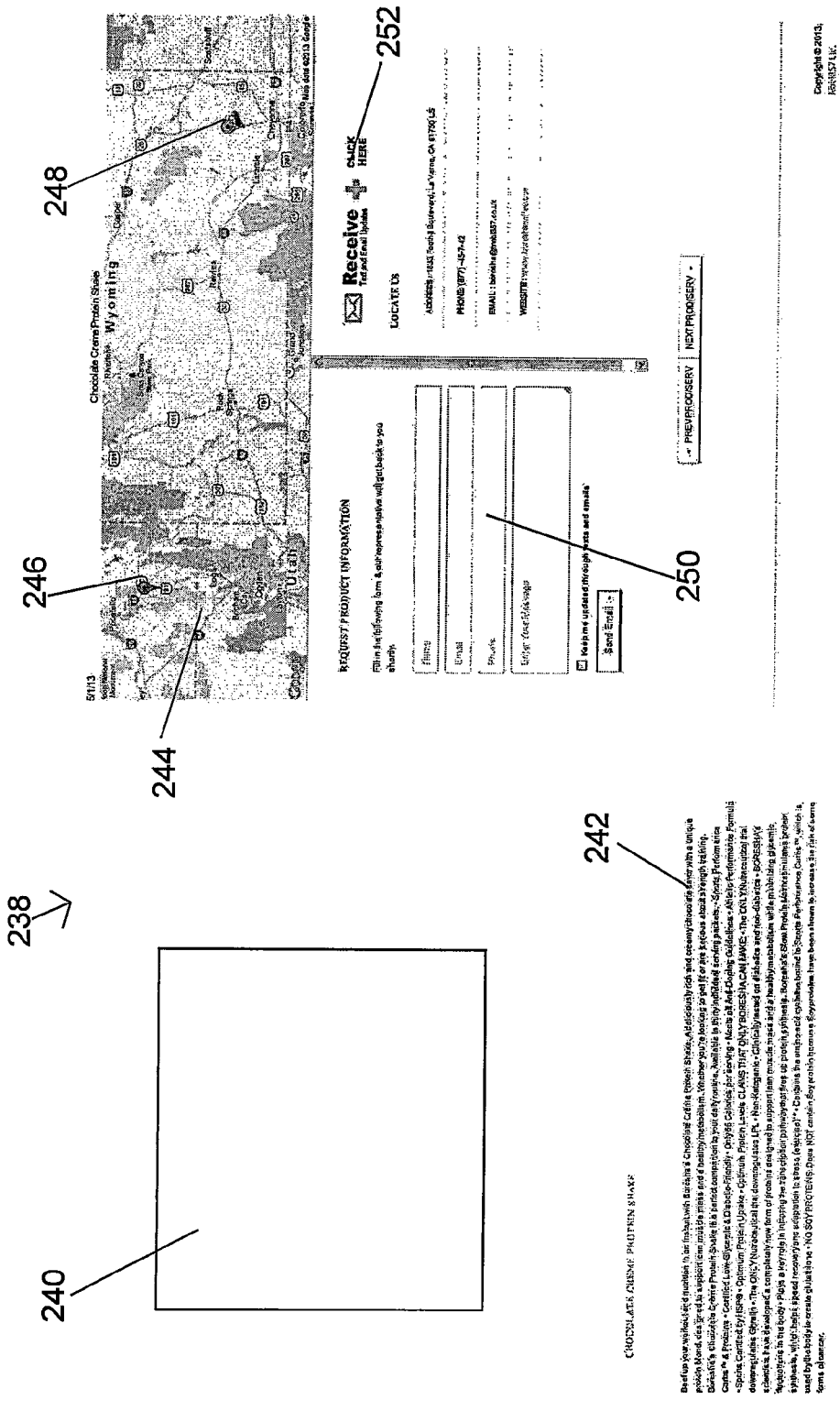
FIG. 9 is a screen shot of a flyer page for a customer-initiated interaction with the embodiment of FIGS. 9a and 9b.
Figure 10:
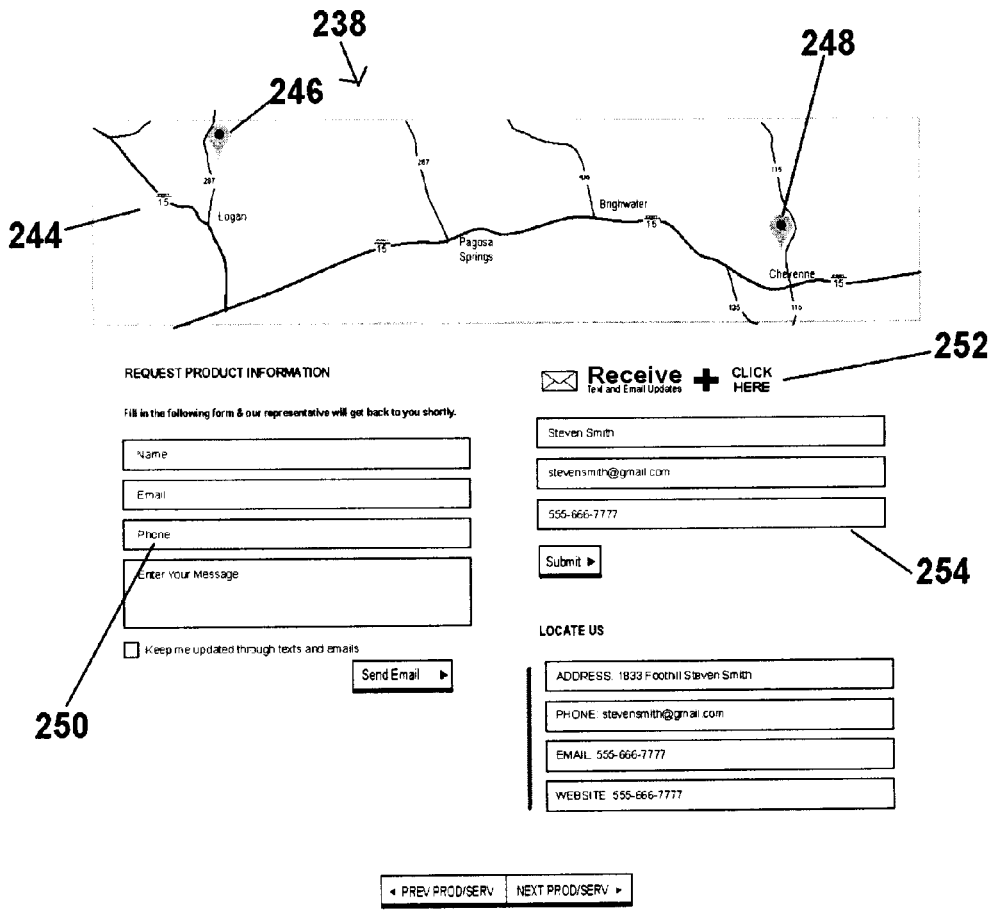
FIG. 10 is a screen shot of the flyer page of FIG. 10 after a "share" button has been clicked.

FIG. 9 shows a flyer page 238 that appeared after the customer clicked on link 238 in FIG. 8a. On the left side is a larger image 240 of the product packaging and a description 242 of the product. Not shown, page 238 may also include video or other media to provide information about the product. On the right side is a map 244 showing the location 246 of the customer, who has opted in for geo-location, and the location 248 of any nearby sales agents. If the customer had not opted in for geolocation, the map would show only the location of the sales agents. In this example, the customer is located near Salt Lake City Utah, the nearest agent is located in a suburb of Denver, Colo., and both locations are shown on map 244. The customer and agent locations may be indicated with different colors. Below the map 244 is a form 250 for the customer to fill out to receive email or telephone follow-up from the agent, including a box to check if the customer wants to opt into receiving subscriber-initiated communications in the future. Also below map 244 is a "share" button 252 labeled "Receive".

If the customer clicks on the "share" button 252, a drop down menu 254 appears, allowing the customer to provide information about a party to whom subscriber-initiated communications may be sent at a later time. The party may be the customer or someone else (a contact) whom the customer thinks might be interested in receiving the subscriber-initiated communications. If the customer clicks on the "Submit" button, this can opt the contact into receiving the information, and the contact's information will be entered into the system's contact database for ZZZ Coffee. Alternatively, the contact may be asked to opt in separately, as described above with respect to the "share" feature.

Example 8

Customer-Initiated Interaction, Real Estate

The system of the present invention can be used for marketing real estate. In this case, the web pages and information are more complex than the web pages for an array of products, such as in Example 7. For real estate, it is desirable to include addresses and locating information on landing and flyer pages. For a landing page of a subscriber who is selling a large number of products or services, such as landing page for a real estate brokerage or a vendor of many products, it may be desirable to include one or more menus or forms to allow the customer to define search criteria to provide only suitable products or properties for viewing by the customer. For real estate in particular, the landing and flyer pages will require a more complex database structure than for a more specialized vendor of a limited number of consumer products, such as in Example 7, and the system may also require a more complex database structure for a large real estate brokerage with numerous offices and many agents.

Figure 11A:
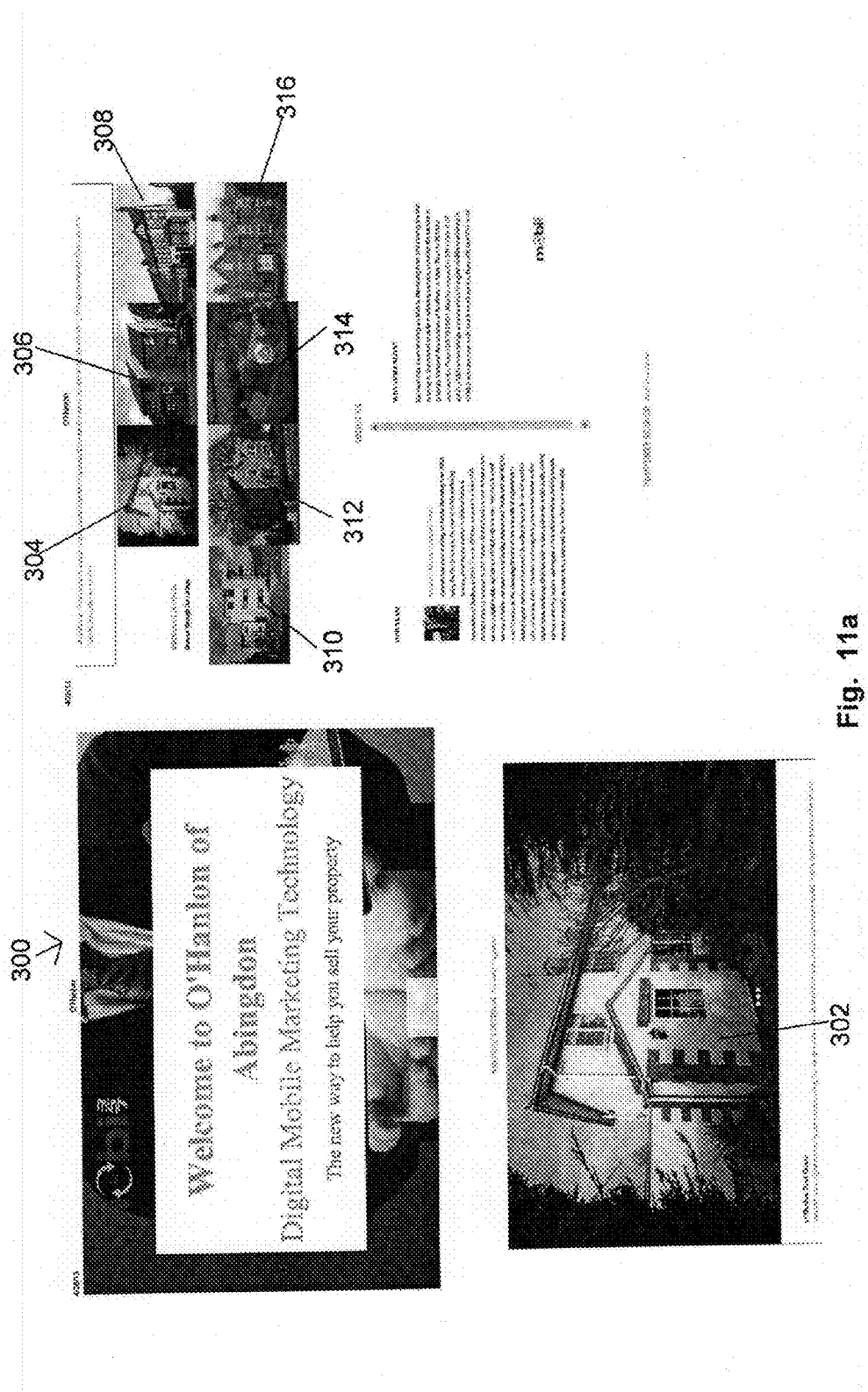
FIGS. 11a and 11b are screen shots of a landing page for a customer-initiated interaction with an embodiment system in accordance with the present invention.
Figure 11B:
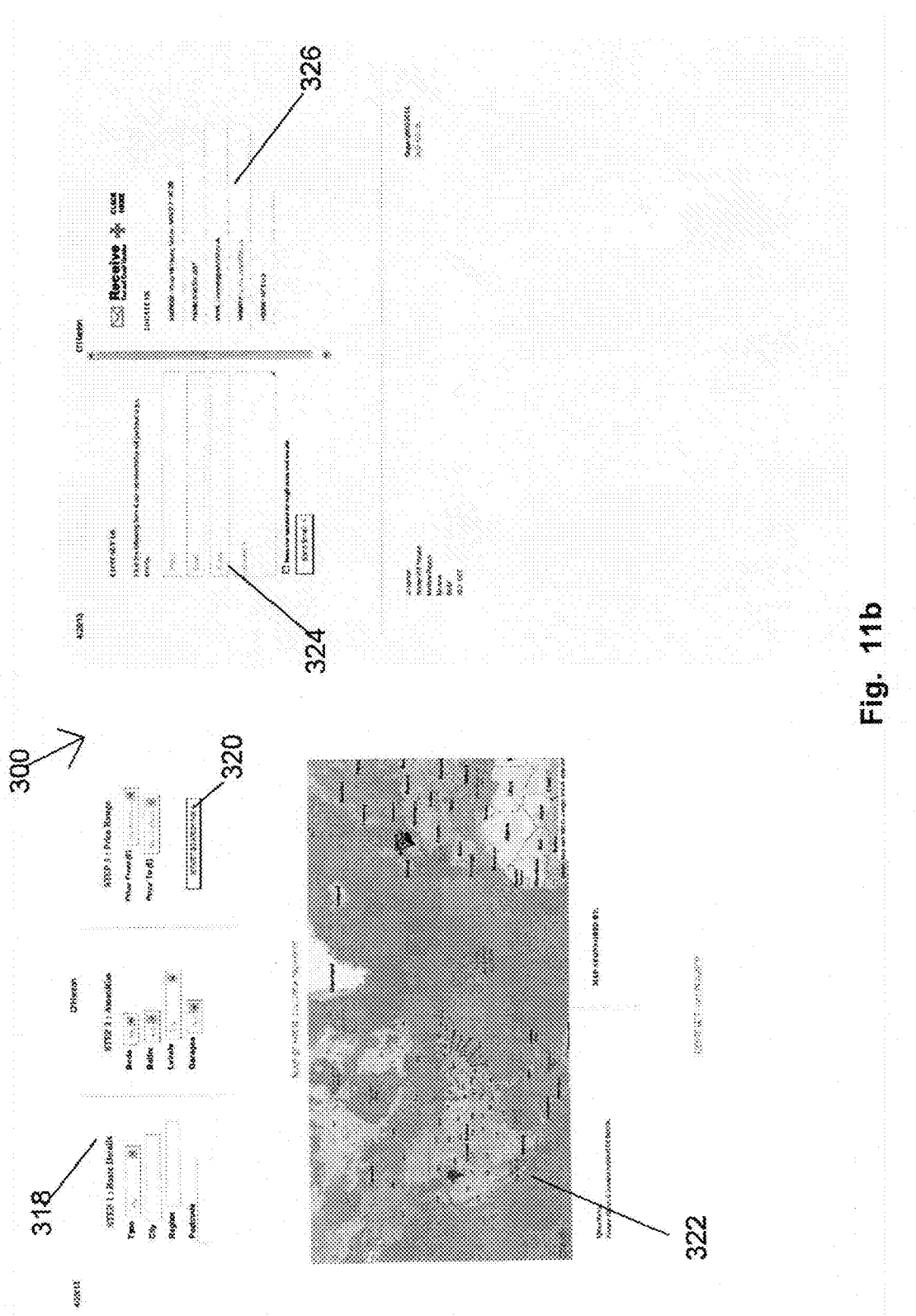

FIGS. 11a and 11b show a landing page 300 for O'Hanlon Real Estate, which is offering homes for sale in Abingdon, UK. Landing page 300 has been accessed by a customer who called or sent a message into the system, perhaps after seeing an advertisement. FIG. 11a includes a photograph 302 of a featured property and photographs 304, 306, 308, 310, 312, 314, and 316 of properties. Each photograph serves as a link to a flyer page with more detailed information about the property in the image. FIG. 11b shows the continuation of landing page 300, with a form 318 that can be filled out by the customer to start a search of properties with desired search criteria. Clicking on the "start searching" button 320 will initiate a search of other properties that meet the search criteria. A map 322 may be provided to aid the customer in locating the properties. As shown, map 322 includes the location of a customer, in Utah, United States, and the location of O'Hanlon Real Estate in Abingdon, UK. Although not shown, map 322 may include standard pan and zoom features to allow a viewer to show more details, such as a street map of Abingdon. Landing page 300 also includes a form 324 that can be completed by the customer to send an email to an agent to request a personal interaction with the agent. The box at the bottom of form 324 with the label "Keep me updated through texts and emails" can be checked if the customer wants to opt in to receive blast updates. Also, form 326 implements a "share" feature and allows the customer to input a name and email address and/or telephone number for follow-up contacts, which may include subscriber-initiated text or email blasts, depending on whether the contact information includes a telephone number or an email address.

Figure 12:
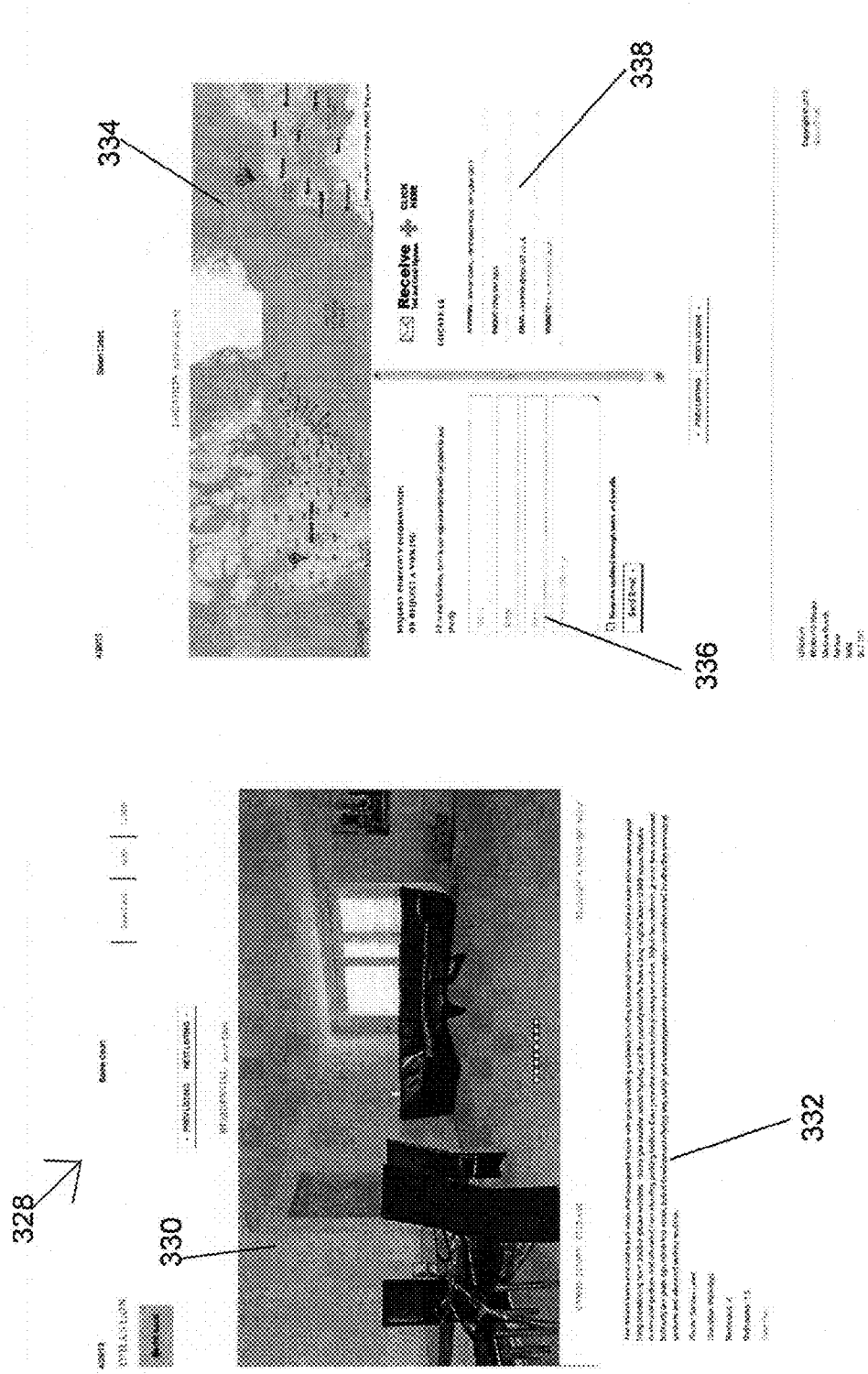
FIG. 12 is a screen shot of a flyer page for a customer-initiated interaction with the embodiment of FIGS. 11a and 11b.

If the customer clicks on one of the photograph links, he or she will then receive a flyer page corresponding to the clicked link. FIG. 12 shows a flyer page 328, which includes one or more photographs 330 of the property for sale, details 332 about the property for sale, a map 334, and forms 336 and 338, similar to forms 324 and 326, that the customer can fill out for subsequent contacts by an agent or by subscriber-initiated email or text blasts.

Example 9

Real Estate, Blast from Ken

A customer who is selling real estate sets up a text and email blast campaign to selected contacts, and the blast includes a landing page and flyer pages. Each contact receives a message that contains a link to the customer's landing page and a link to click if the contact wants to opt out of receiving future blast communications.

Figure 13:
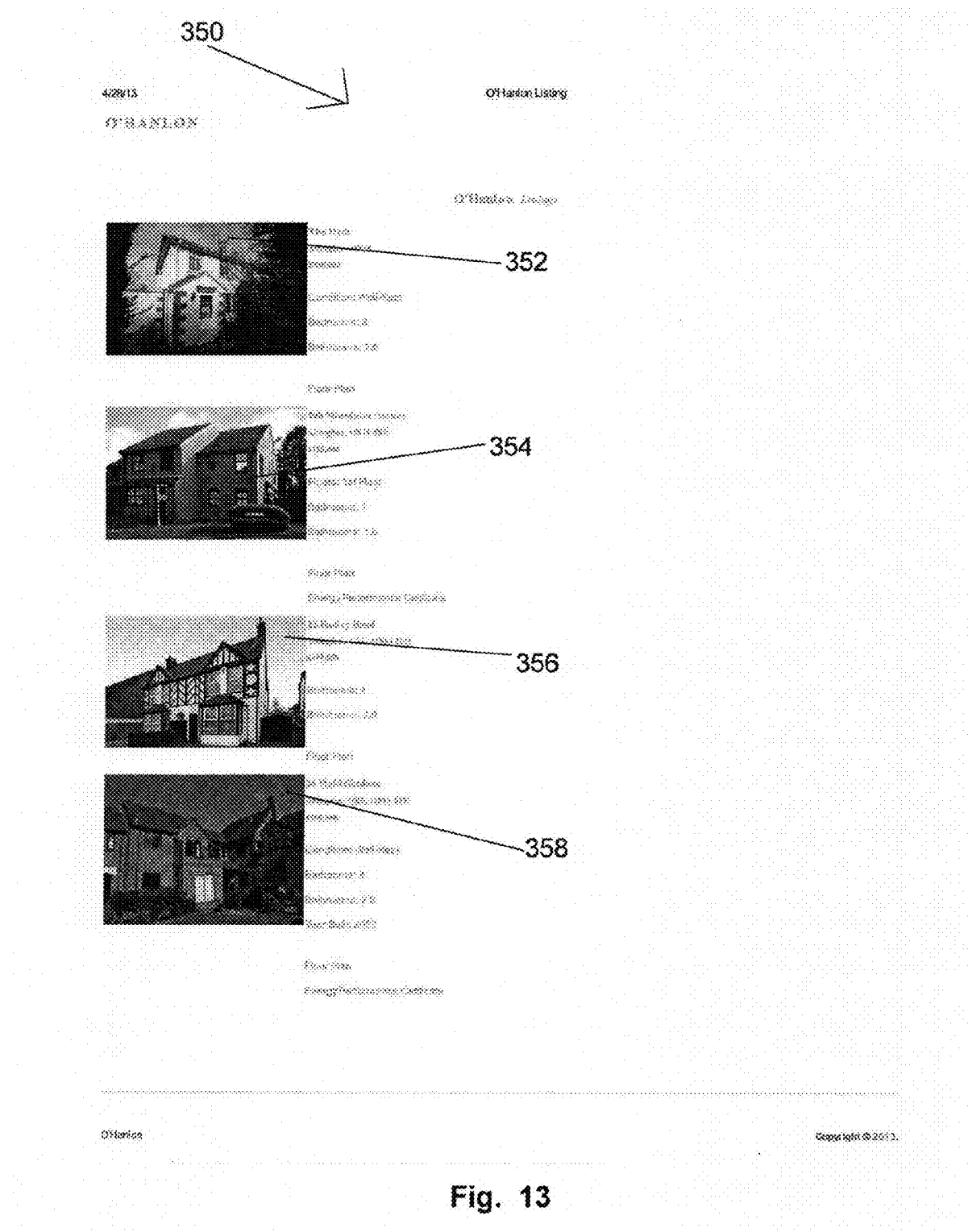
FIG. 13 is a screen shot of a landing page for a subscriber-initiated interaction with the embodiment of FIGS. 11a and 11b.
Figure 14:
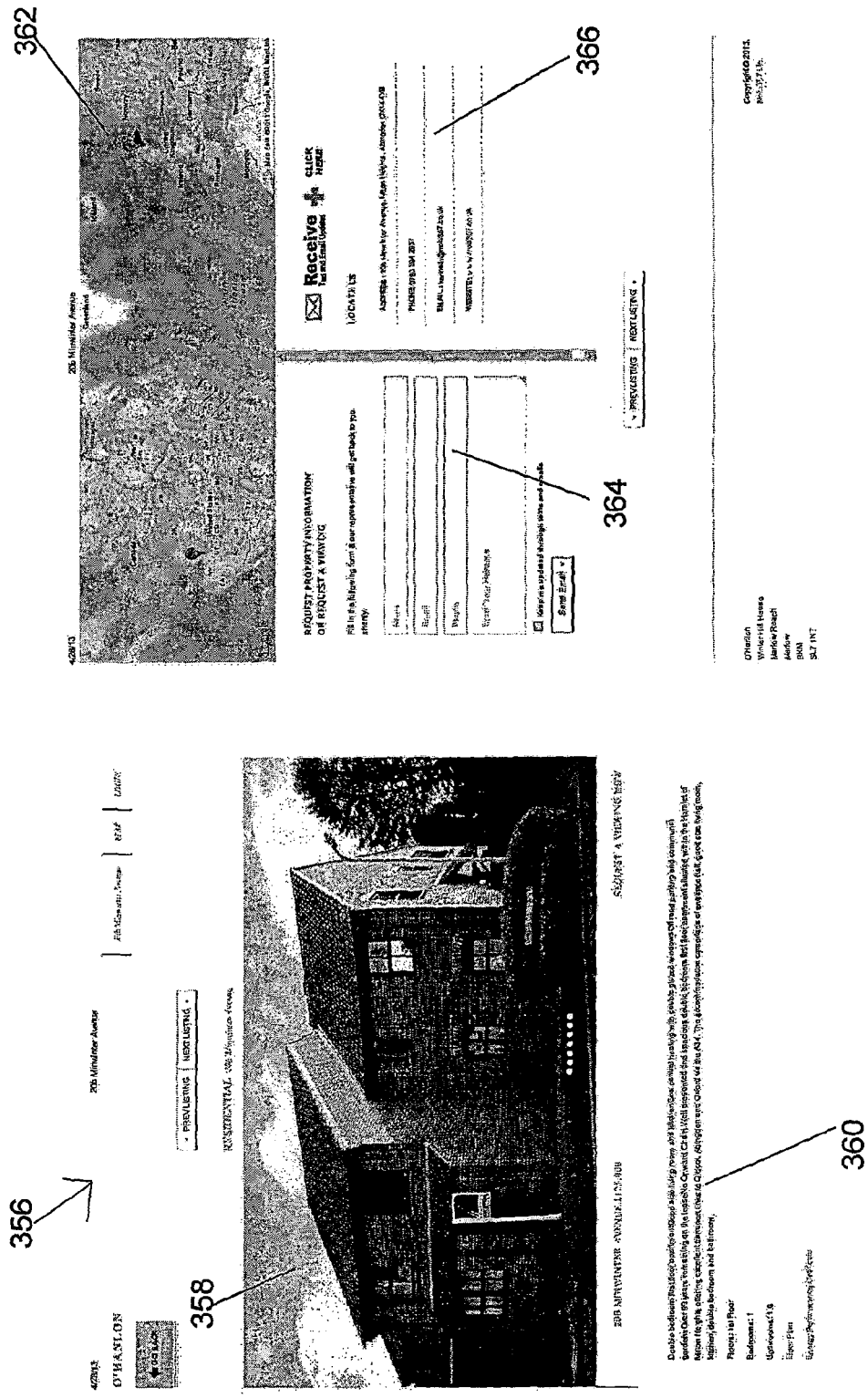
FIG. 14 is a screen shot of a flyer page for a subscriber-initiated interaction with the embodiment of FIGS. 11a and 11b.

The contact clicks on the link to the landing page, and landing page 350, shown in FIG. 13, is sent to the customer's device. Landing page 350 includes links to four properties that are for sale, indicated by photographs 352, 354, 356, and 358. The contact clicks on photograph 354, and the browser is directed to flyer page 356 in FIG. 14, which displays one or more additional photographs 358, a detailed description of the property 360, a map 362 with zoom and pan capability, and forms 364 and 366, which are similar to forms 324 and 326 in FIG. 11b, to allow the contact to opt into receiving additional information via subsequent blasts and/or directly from the listing agent, and to designate additional contacts with whom the blast information should be shared.

Example 10

Internet-Based Wager System

Currently, within the United States laws prohibit placement and receipt of wagers via electronic devices without knowing the location of the device from which the wager is placed. This restriction arose from the need of federal, state, and local government agencies to track such transactions for purposes including law enforcement and collection of taxes imposed on the transactions.

Figure 15:
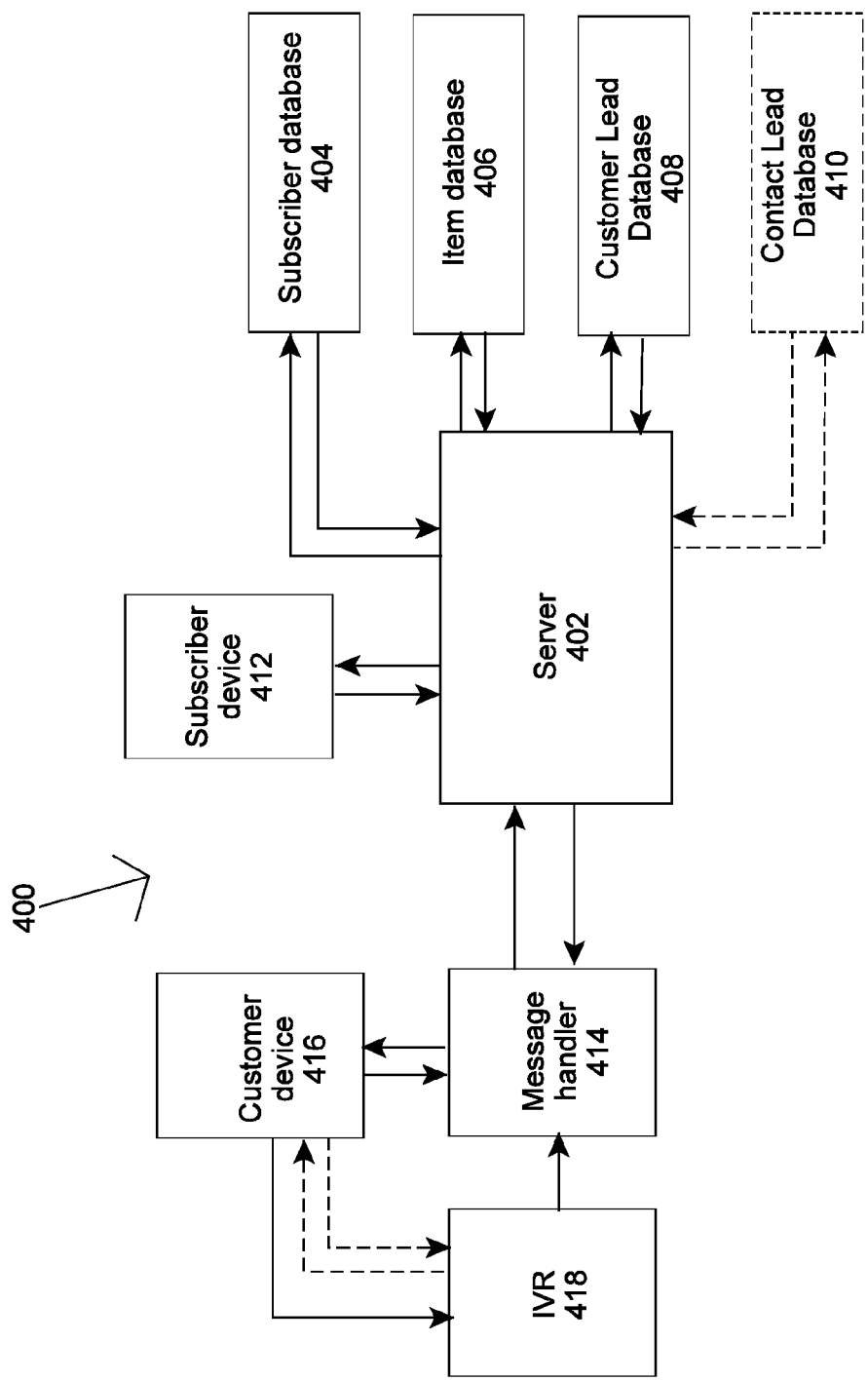
FIG. 15 is a block diagram of a wagering system in accordance with the present invention.

Because the system of the present invention can geolocate the customer device, the system can be used for internet-based wagering in compliance with these laws. In this case, the objects for sale are wagers, such as bets on the outcome of a horse race. As shown in FIG. 15, a customer uses his or her device 416 to contact system 400 and place a bet. The initial contact can be either via a message sent directly to message handler 414 or a telephone call to IVR 418, as described above for system 100. As part of the process to initiate a wager, the customer must register, which includes opting into geolocation, thus providing the location of the device to the system and satisfying the legal requirements for knowing the location from which each bet is placed, and the customer must also provide payment information, such as a number for an account from which losses and service fees can be charged and to which gains can be credited. After the user places the bet, the text or email messages sent from system to the customer's device may include a media version of the basis of the wager, such as a short video of the outcome of the race, a final score, an audio or video presentation of the event, and so on. U.S. Pat. No. 7,643,821 describes the use of text messages containing a variety of media.

In wagering system 400, the subscriber or subscribers are entities of the type that currently handle wagering businesses. Subscriber database 404 includes information about the subscribers, and item database 406 includes information about the subject matter of the wagers, which can be retrieved by server 402 and sent to customer device 416. Customer lead database 408 includes information about the identity of the customers and their wagers. Contact lead database 410 may be used if customers opt into receiving subscriber-initiated messages, such as notices about upcoming events available for new wagers. It may not be desirable for customers to provide contact information for parties other than themselves; the customers may not want to provide wagering information to friends and dilute their potential earnings, nor may they want to disclose their gambling to others.

Example 11

Emergency Response System

Recently, the Federal Communications Commission has mandated that "911" emergency response systems must be able to use visible communications, such as text messages, as well as the audio communications already in use. This is to allow disabled individuals, including deaf, hearing-impaired, and/or mute people, to communicate during emergencies.

An embodiment of the system of the present invention, shown in FIG. 16, can provide the basis of such an emergency response system 500, particularly if it uses the session method for tracking incoming and outgoing text messages. It is important that emergency messages are handled with high priority. Thus, in the emergency context, text messages are preferred over email messages because they can be transmitted faster, relying on the prioritized text messages described herein and in U.S. Pat. No. 7,643,821, which bypass part of the network structure of commercial cell phone carrier systems. Further, text messages arrive at the "customer" device even if there is no active connection, as happens with telephone calls. A device user cannot be alerted by email messages without an established internet connection. Further, in some emergency situations, internet services may not be operating. It is also preferable that the system 500 be accessible via incoming text messages to a telephone number, rather than only by short codes, because short codes cannot be used in some areas.

However, the emergency response system 500 may be implemented using internet communications, particularly if emergency response facilities have their own antennae for wifi and/or wimax transmission, allowing emergency responders to pick up signals when commercial antennae are not functioning. It may be desirable for service users to opt into geolocation for emergency calls when they register for the service, such as when they purchase or set up their phones.

The emergency response system 500 can also route messages to emergency responders, such as police offices, fire stations, ambulance services, and the like, who in this case would be "subscribers," via a reporting function, similar to the reporting function described above for system 100. Multiple stations, such as within a large city, and individual officers can be included in the system, much as offices and agents are handled by system 100.

The caller sending in the initial request for emergency assistance can also send in a photograph or video, available with current "smart phones," with the incoming message handled as described in application Ser. No. 13/536,847 if it includes photographs or video. A caller can initiate an interaction with system 500 by sending a text message with his or her device 516. The message is received by an operator 514, who may be a live person and or a combination of a live person and a message handling device. It is preferable to have a live operator to facilitate appropriate responses to a large range of emergency situations and to avoid unnecessary delays while the caller navigates through a series of menus. The live operator may be sitting in front of a screen that allows the operator to follow multiple interactions that are in progress, such as a request for an ambulance from a first caller, a request for police assistance with a burglary in progress from a second caller, and a request for help with a fire from a third caller. The operator 514 sends messages to server 502, which interacts with databases 504, 506, 508, and 510. Database 504 includes information about emergency responders, such as what types of emergencies they will respond to (police, fire, ambulance, etc.) and the areas they serve. Item database 506 contains information provided by the emergency responders that may be sent to a caller device 516 during an emergency, such as written instructions, images, and video. Incoming call database 508 stores information, including sessions, for incoming calls, and possibly also the nature of any disability each caller. It is important to archive records of such calls for variety of purposes, including gathering statistical information, training, quality control, law enforcement, and litigation involving parties involved in the response.

After receiving an incoming text message from caller device 516, system 500 sends outgoing text messages back to device 516, which may include a variety of text-formatted media content as described in U.S. Pat. No. 7,643,821. Although commercial cell service providers generally limit the length of text messages to 160 characters, system 500 partially bypasses commercial cell phone systems to provide high-priority responses, and the messages are unlimited in length. System 500 may operate without using URLs, since some calling devices may not accommodate web pages.

Subscriber-initiated text messages can be used in a manner similar to "reverse 911" to notify people in a targeted area of an impending situation. Thus, "reverse 911" database 510 includes phone numbers for use when an emergency responder wants to initiate a communication. Preferably, it also includes information about any disability of the person associated with each telephone number. In some areas outside the United States, emergency responders may automatically have access to cell phone numbers to initiate communications. However, this is not presently the case within the United States. Thus, phone users may be asked to opt into receiving "reverse 911" messages, such as when they purchase or set up their phones. This would be an attractive service for anyone who is disabled enough to want to rely on text message alerts in place of voice telephone calls.

In system 500, tracking of emergency communications may occur without the lead digests described above with reference to system 100. The system 500 may be configured to have device 516 automatically send a text message back to indicate that a text message sent by system 500 was received by device 516, allowing tracking of interactions between callers and the system. Although this type of "reverse text" is not feasible for general communications, such as for marketing purposes, due to the expense of sending large numbers of text messages, it is feasible for an emergency system.

Outgoing text messages sent to caller device 516 may include written instructions, such as "Don't move the victim" or "Stay indoors" and/or images and/or video clips showing emergency procedures, such as how to use a defibrillator, all provided in SMS format as described in U.S. Pat. No. 7,643,821. During an interaction with system 500, a caller may be asked to provide a zip code or nearby street intersection or street address for locating the caller, and/or a photograph or video taken with the caller's device 516 can be used to obtain the caller's location.

The emergency response system 500 can be implemented through installation of software without major improvements to existing infrastructure for emergency responders. Currently, emergency response locations, such as police and fire stations, have their own cell antennae for sending and receiving telephone messages, bypassing the full networks of commercial cell phone service providers, and they often have generators for providing power in case of a power failure. The location of the caller and his or her device can be determined using the device network address and wifi or wimax triangulation and shown on a screen at the police station, fire station, etc., or via information provided by the caller. It may be necessary to add capability for handling wifi and/or wimax communications, text messaging, and some computer hardware, such as servers, and access to the "cloud."

The foregoing description is considered as illustrative only of the principles of the invention. Further, since numerous modifications and changes will readily occur to those skilled in the art, it is not desired to limit the invention to the exact construction and process shown and described above. Accordingly, all suitable modifications and equivalents may be resorted to falling within the scope of the invention.

LIST OF REFERENCE NUMERALS

FIGS. 1-7
system 100
server 102
subscriber database 104
item database 106
customer database 108
contact database 110
subscriber device 112
message handler 114
customer's electronic device 116
IVR 118
contact device 120
URL with an appended lead digest 130
page 132 that displays links to all of the subscriber-selected pages
page 134 that displays links to all of the subscriber-selected pages
FIGS. 8a, 8b, 9, and 10
landing page 200
graphic 202
background 204
box 206
tag lines 208, 210, and 212
images 214, 216, 218, 220, 222, 224, 226, and 228 of product packages
description 230 of products
images 232 of the management team
form 234
"share" button 236
flyer page 238
image 240 of the product packaging
description 242
map 244
Customer location 246
agent location 248
form 250
share" button 252
drop down menu 254
FIGS. 11-14
landing page 300
photograph 302
photographs 304, 306, 308, 310, 312, 314, and 316
form 318
"start searching" button 320
map 322
form 324 to send an email to an agent
form 326 "share" feature
flyer page 328
photographs 330
details 332
map 334
336 and 338, similar to forms 324 and 326
landing page 350
photographs 352, 354, 356, and 358
flyer page 356
additional photographs 358
description of the property 360
map 362
form 364 more info from agent
form 366 share
FIG. 15
system 400
server 402
subscriber database 404
item database 406
customer lead database 408
contact lead database 410
message handler 414
device 416
IVR 418
FIG. 16
emergency response system 500
device 516
operator 514
server 502
database 504 information about emergency responders
database 506 item
incoming call database 508
"Reverse 911" database 510

I claim:

1. A system for handling messages and distributing information, comprising:
means for processing information;
means for receiving incoming messages from customer telecommunication devices, said incoming messages selected from telephone calls, text messages, email messages, code messages, images, video, and combinations thereof, and for sending outgoing messages selected from text messages and email messages, said means for receiving incoming and sending outgoing messages in communication with said means for processing information;
means for transmitting incoming subscriber information from a subscriber communication device to said means for processing and for sending lead reports from said means for processing to said subscriber device;
a subscriber database with information relating to at least one subscriber, said subscriber database accessible by said means for processing information;

an item database with web page URLs provided by the at least one subscriber containing information about at least one item offered by the at least one subscriber to the customers, said item database accessible by said means for processing information; and a customer database containing identifying information about the customers, said customer database accessible by said means for processing information;

wherein said system is capable of performing, during an interaction with a customer, operations selected from:

receiving a request from a customer telecommunication device for additional information;

sending messages to the customer telecommunications device to provide links to URLs containing information from said item database combined with identifying information about the particular customer device to the customer devices, said identifying information selected from the telecommunications device model, the telecommunications device telephone number, the telecommunications device network address, and combinations thereof;

responding to a request from a customer for information by combining at least one URL from said item database with identifying information about the customer to form a new URL and sending an outgoing message with a link to the new URL to the customer, said outgoing message formatted for the telecommunication device model;

tracking said identifying information about the customer device for each request for information received from the customer, said identifying information selected from the telecommunications device model, the telecommunications device telephone number, the telecommunications device network address, and combinations thereof; and sending reports to the subscriber whose information was requested, said reports including the date and time said subscriber information was requested, identifying information about the contact, and identifying information about the items associated with the URLs the customer requested and for which the links were opened on the customer telecommunications device.

2. The system of claim 1, further comprising a message handler for receiving incoming messages from customers and transmitting outgoing messages to customers.

3. The system of claim 2 further comprising a subscriber-programmable IVR in communication with said message handler.

4. The system of claim 1, wherein the content of said item database is subscriber-controlled.

5. The system of claim 1, wherein said messages sent to the customer telecommunications device are selected from text messages and email messages.

6. The system of claim 1, wherein said system comprises an interne wagering system.

7. The system of claim 1, wherein said system comprises an emergency response system, and each said at least one subscriber is an emergency responder.

8. The system of claim 1, wherein:

said system further comprises a contact database containing identifying information about contact telecommunication devices to which information may be sent independently of communications with customer devices, said contact database accessible by said means for processing information; and said system is capable of performing, during an interaction with a contact, operations selected from:

initiating a contact with a contact telecommunications device using contact identifying information retrieved from said contact database;

receiving a request from the contact telecommunications device for additional information;

sending messages including links to URLs containing information from said item database combined with identifying information about the particular contact device to the contact devices, said identifying information selected from the telecommunications device model, the telecommunications device telephone number, the telecommunications device network address, and combinations thereof;

responding to a request from a contact telecommunications device for information by combining at least one URL from said item database with identifying information about the contact to form a new URL and sending an outgoing message with a link to the new URL to the contact, said outgoing message formatted for the telecommunications device model;

tracking the identifying information about the contact device for each request for information received from the contact, said identifying information selected from the telecommunications device model, the telecommunications device telephone number, the telecommunications device network address, and combinations thereof;

sending reports to the subscriber whose information was requested, said reports including the date and time said subscriber information was requested, identifying information about the contact, and said items associated with the URLs the contact requested and for which the links were opened on the contact telecommunications device; and combinations thereof.

9. The system of claim 8, wherein said messages sent to the customer telecommunications device are selected from text messages and email messages.

10. The system of claim 8, wherein:

said system comprises an emergency response system;

each said at least one subscriber is an emergency responder;

each customer is a person who initiates an interaction with said system via a text or email message;

said system is operative to initiate an interaction with at least one contact telecommunications device with a message selected from text messages, email messages, and combinations thereof; and said system is operative to receive notifications from each contact telecommunications device, said notification indicating the date and time the outgoing message was viewed and identifying information about the contact telecommunications device.

11. The system of claim 8, wherein said system is further operative to perform functions selected from:

receiving, from a customer, contact identifying information about a plurality of contacts from a customer, said contact identifying information selected from contact names, contact email addresses, and contact telephone numbers;

storing said contact identifying information in said contact database;

retrieving said contact identifying information from said contact database, said contact information selected by a subscriber; and combinations thereof.

12. The system of claim 1, wherein:
incoming and outgoing text messages are handled with the same priority as telephone calls;
incoming and outgoing text messages are unlimited in length;
and incoming and outgoing text messages include SMS formatted information selected from text, links to URLs, images, video, and combinations thereof.

13. The system of claim 6, further comprising at least one feature selected from:
customer opt-in features for receiving additional information;
customer opt-out features for receiving additional information;
customer opt-in features for opting into geolocation by said system;
customer opt/out features for opting out of geolocation by said system;
contact opt-in features for receiving additional information;
contact opt-out features for receiving additional information;
contact opt-in features for opting into geolocation by said system;
contact opt/out features for opting out of geolocation by said system.

14. The system of claim 1, wherein said customer device contact information incorporated into said new URL is encrypted as a hash digest.

15. The system of claim 1, wherein said means for processing information comprises a server.

16. The system of claim 1, wherein said system is operative to allow each subscriber to change subscriber landing and flyer page URLs previously provided and stored in said item database and key words and tags for search engine optimization.

17. A method for handling messages and distributing information, comprising the steps of:
a. receiving subscriber information including identifying information about each subscriber, and a plurality of URLs including at least one flyer page URL and at least one landing page URL with a link to at least one of said flyer page URLs, for which URLs the customer wants links disseminated; storing said subscriber identifying information in a subscriber database and storing said landing and flyer page URLs in an item database;
b. receiving an initial request from a customer telecommunications device for a subscriber landing page URL in said item database, said request being in response to an advertisement and having a format selected from telephone calls, text messages, email messages, codes, images, and video;
c. collecting identifying information about said customer telecommunications device, said information selected from email addresses, telephone numbers, and combinations thereof and retrieved from a location selected from said customer device, a customer database, and combinations thereof;
d. retrieving said landing page URL, combining said landing page URL with said customer device identifying information to form a new landing page URL with said customer device identifying information included in each flyer page link on said landing page;
e. sending an outgoing message to the customer device, said message including a link to said new landing page URL;
f. receiving a request from said customer device to display a flyer page URL corresponding to a link on said landing page;
g. retrieving said customer-requested flyer page URL from said item database, combining said customer-requested URL with said customer device identifying information to form a new flyer page URL, said new flyer page URL including at least one link to an additional flyer page URL;
h. sending an outgoing message to the customer device, said message including said new URL;
i. reporting the date and time when said incoming request was received to a subscriber device; and
j. storing said reported information in said customer database.

18. The method of claim 17, wherein steps f through j are repeated.

19. The method of claim 17, further comprising the steps of:
forming a session containing information about said customer device;
recording in said session the date and time of each customer request for a subscriber landing page and each customer request for a subscriber flyer page, said identifying information about the customer device; and which subscriber landing and flyer pages were requested;
saving said session in said customer database; and
retrieving said session from said customer database.

20. The method of claim 17, wherein said customer device identifying information is encrypted in each message sent to said customer device.

21. A method for handling messages and distributing information, comprising the steps of:
a. receiving subscriber information including identifying information about each subscriber, and a plurality of URLs including at least one flyer page URL and at least one landing page URL with a link to at least one of said flyer page URLs, for which URLs the subscriber wants links disseminated; storing said subscriber identifying information in a subscriber database and storing said landing and flyer page URLs in an item database;
b. receiving identifying information about at least one contact telecommunications device, said contact identifying information including data selected from the contact's name, the device telephone number, the telephone network address, and combinations thereof, and storing said contact information in a contact database;
c. receiving subscriber information including a selection of at least one of said landing page URLs in said item database, at least one of said flyer page URLs in said item database, and at least one contact selected from said contact database;
d. sending an outgoing message to each of said selected contacts, each of said outgoing messages including a link to at least one of said landing page URLs, with each outgoing message having a format selected from text messages and email messages;
e. receiving a response from a contact device requesting one of said landing page URLs;
f. retrieving said landing page URL, combining said landing page URL with said contact device identifying information to form a new landing page URL with said contact device identifying information included in each flyer page link on said landing page;
g. sending an outgoing message to the contact device, said message including a link to said new landing page URL;

h. receiving a request from said contact device to display a flyer page URL;
i. retrieving said contact-requested flyer page URL from said item database, combining said contact-requested URL with said contact device identifying information to form a new flyer page URL, said new flyer page URL including at least one link to an additional flyer page URL;
j. sending an outgoing message to the contact device, said message including said new URL;
k. reporting the date and time when said incoming request was received to a subscriber device; and
l. storing said reported information in said contact database.

22. The method of claim 21, wherein steps h through l are repeated.

23. The method of claim 21, further comprising the steps of:
forming a session containing information about the contact device;
recording in said session the date and time of each contact request for a subscriber landing page and each contact request for a subscriber flyer page, said identifying information about the contact device, and which subscriber landing and flyer pages were requested;
saving said session in said contact database; and
retrieving said session from said contact database.

24. The method of claim 21, wherein said contact device identifying information is encrypted in each message sent to said contact device.

* * * * *